(12) United States Patent
Russell

(10) Patent No.: US 12,006,260 B2
(45) Date of Patent: Jun. 11, 2024

(54) POROUS, PERMEABLE METAL-CEMENT BASED CONCRETES AND METHODS FOR MAKING SAME

(71) Applicant: Matthew F. Russell, Spokane, WA (US)

(72) Inventor: Matthew F. Russell, Spokane, WA (US)

( * ) Notice: Subject to any disclaimer, the term of this patent is extended or adjusted under 35 U.S.C. 154(b) by 137 days.

(21) Appl. No.: 17/300,773

(22) Filed: Nov. 1, 2021

(65) Prior Publication Data

US 2023/0133285 A1    May 4, 2023

(51) Int. Cl.

| | |
|---|---|
| C04B 22/04 | (2006.01) |
| C04B 14/06 | (2006.01) |
| C04B 14/10 | (2006.01) |
| C04B 22/06 | (2006.01) |
| C04B 22/16 | (2006.01) |
| C04B 38/06 | (2006.01) |
| C04B 40/00 | (2006.01) |
| C04B 103/30 | (2006.01) |

(52) U.S. Cl.
CPC .............. *C04B 22/04* (2013.01); *C04B 14/06* (2013.01); *C04B 14/10* (2013.01); *C04B 22/068* (2013.01); *C04B 22/165* (2013.01); *C04B 38/0605* (2013.01); *C04B 40/0089* (2013.01); *C04B 2103/30* (2013.01)

(58) Field of Classification Search
CPC ..... C04B 22/04; C04B 22/068; C04B 22/165; C04B 14/06; C04B 14/10; C04B 38/0605; C04B 40/0089; C04B 2103/30
See application file for complete search history.

(56) References Cited

U.S. PATENT DOCUMENTS

| | | | | |
|---|---|---|---|---|
| 3,429,724 A | * | 2/1969 | Angstadt | C04B 22/12 |
| | | | | 106/734 |
| 2019/0337861 A1 | * | 11/2019 | Luthe | C04B 38/10 |

OTHER PUBLICATIONS

Bhatt et al. "Physical, chemical, and geotechnical properties of coal fly ash: A global review", 2019. Case Studies in Construction Materials 11 e00263, p. 1-11. (Year: 2019).*

(Continued)

*Primary Examiner* — Coris Fung
*Assistant Examiner* — Catriona M Corallo
(74) *Attorney, Agent, or Firm* — John S. Reid

(57) ABSTRACT

A method for manufacturing a concrete product includes providing a metal-based cementing agent, and an acid-based cement reacting agent of the form $H_nXO_m$, where "X" is an element selected from group consisting of phosphorous, carbon, sulfur and boron, "n" and "m" are selected so that the cement reacting agent is an acid, and "X" will bond with the metal-based cementing agent to form a metal cement. The method further includes providing an aggregate defined by an exposed surface area having metallic aggregate linking elements thereon which can chemically bond with "X" in the presence of the acid-based cement reacting agent, and providing a hydroxide-supplying additive. The method includes combining together the metal-based cementing agent, the acid-based cement reacting agent, the aggregate and the hydroxide-supplying additive, and allowing the metal-based cementing agent and the acid-based cement reacting agent to react and bond with the aggregate to form the concrete product.

20 Claims, 9 Drawing Sheets

(56) References Cited

OTHER PUBLICATIONS

"Use of Admixture and Its Effects on Setting Time", Sep. 26, 2020. Pennsylvania State University. (Year: 2020).*

Horszczaruk et al. "Mechanical properties of shielding concrete with magnetite aggregate subjected to high temperature", 2015. Procedia Engineering, p. 39-46. (Year: 2015).*

Chaitanya et al. "Influence of Hydrogen Peroxide and Polypropylene Admixtures in Pervious Concrete with a Partial Replacement of Flyash in Cement", 2016. International Journal of Advanced Technology and Innovative Research, p. 93-98. (Year: 2016).*

Kuranchie et al. "Utilisation of iron ore tailings as aggregates in concrete", 2015. Cogent Engineering, p. 1-11. (Year: 2015).*

Kavitha et al. "Utilization of Quartzite as Fine Aggregate in Concrete", 2015. Jounral of Science and Technology, p. 45-53. (Year: 2015).*

"EPK Clay", 2018. Edgar Minerals. (Year: 2018).*

"Indian Standard Specification for Coarse and Fine Aggregates from Natural Sources for Concrete", 1993. Bureau of Indian Standards, p. 1-20. (Year: 1993).*

Merriam-Webster, "Clay", 2023. https://www.merriam-webster.com/dictionary/clay (Year: 2023).*

"Maguire Low Pressure Dryers", 2019, p. 1-3. (Year: 2019).*

\* cited by examiner

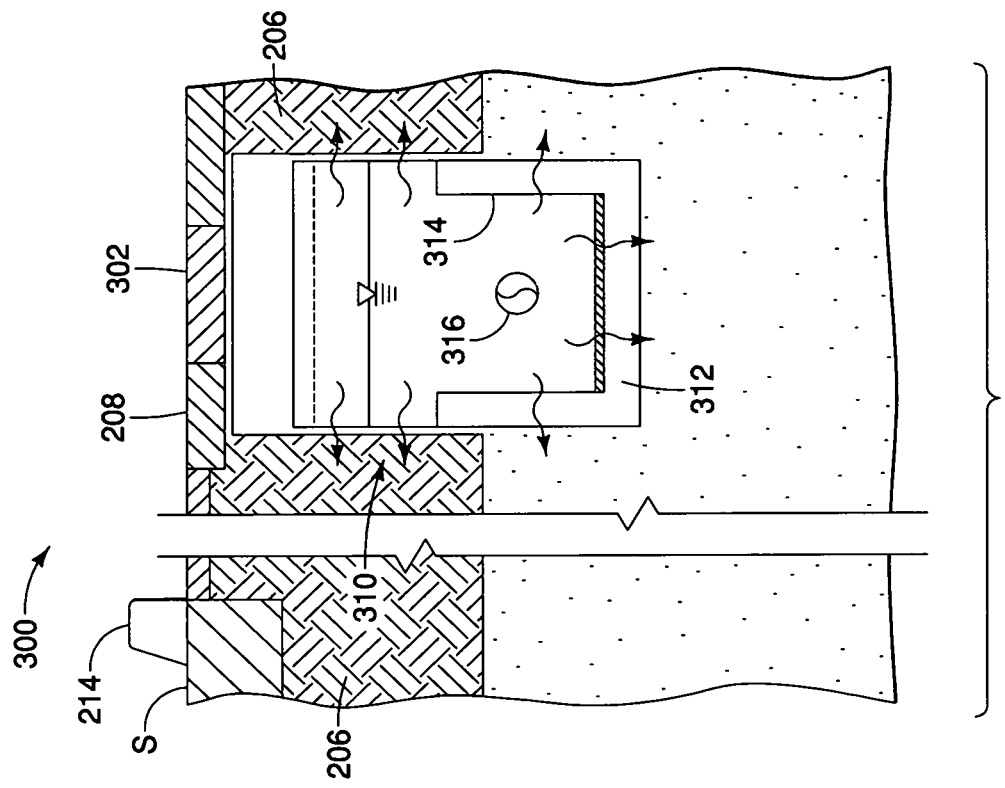
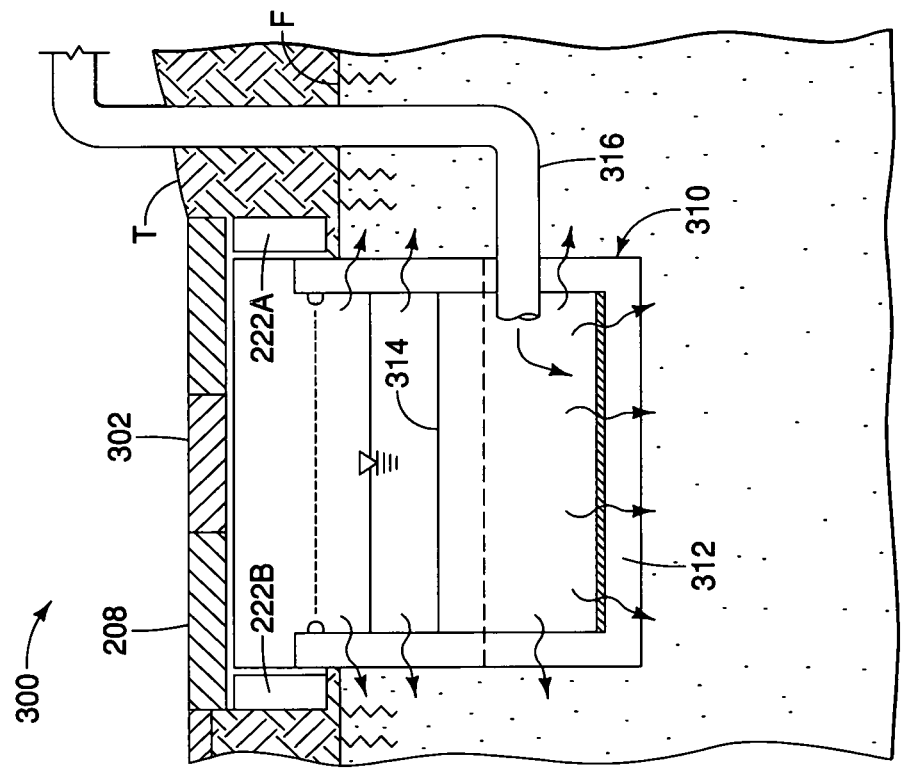

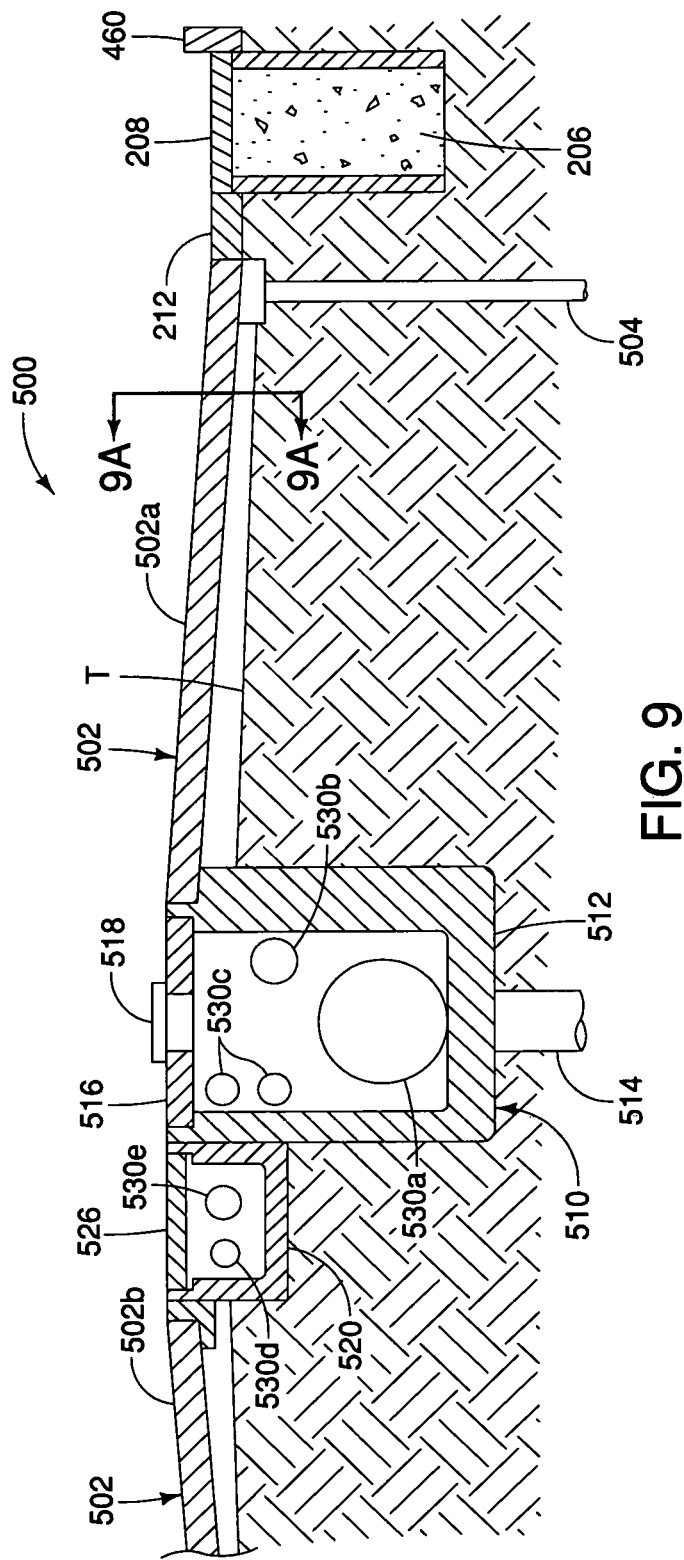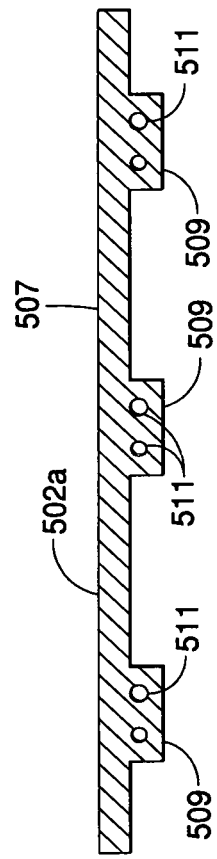

POROUS, PERMEABLE METAL-CEMENT BASED CONCRETES AND METHODS FOR MAKING SAME

BACKGROUND

Portland cement is by far the cement most commonly used in civil engineering projects (e.g., road surfaces, bridges, dams, buildings, etc.). This is due to Portland cement's low cost and high availability. However, concrete products formed using Portland cement suffer from a number of problems—among them: poor freeze-thaw resistance; poor resistance to chemicals such as ice melters and acids; deterioration of strength at temperatures above 700 F (e.g., in the event of a fire); the expansion of corrosion products of any steel reinforcement bars; aggregate expansion; sea water effects; bacterial corrosion; leaching; erosion by fast-flowing water; physical damage; and chemical damage (from carbonation, chlorides, sulfates and distillate water). In general, concrete manufactured using Portland cement is highly susceptible to deterioration in strength due to environmental conditions to which it may likely be exposed. This is evidenced by the deterioration of Portland-cement based road surfaces (such as freeways), and the crumbling of Portland-cement based bridges, overpasses, buildings and sidewalks.

In the formation of Portland cement-based concrete, the resulting concrete product derives its strength primarily from chemical bonds within the cement itself, and not from chemical bonding between the cement and the aggregate. The curing reaction of Portland cement is a hydration reaction, resulting in chemical bonding of calcium and silicon within the cement itself, with very little chemical bonding of the cement to the aggregate. More specifically, the curing of Portland cement results in a silicon atom bonded to a calcium atom by an oxygen atom—Si—O—Ca. While the Si—O bond is a strong chemical bond, the O—Ca bond is a relatively weak bond—the bond that will fail first under compressive and tensile stress. Thus, Portland-cement-based-concrete derives its strength primarily from: (i) the chemical bonds within the cement itself; and (ii) interference of sheering of the cured cement by virtue of the presence of the aggregate. That is, a minimal contribution to the strength of Portland-cement-based-concrete can be attributed to chemical bonds formed between the cement and the aggregate. Portland cement has a typical compressive strength of about 1500-14,000 psi, and common aggregates used with Portland cement have a compressive strength of about 15,000-80,000 psi, with the resulting concrete product having a compressive strength of about 2500-16,000 psi. This extreme difference in compressive strengths of the components used to manufacture Portland-cement based concrete results in a reduction in durability of the resulting concrete. Additionally, there is a significant difference between the stress/strain characteristics of cured Portland cement and the typical aggregate used in Portland-cement based concrete. That is, Portland cement exhibits greater elongation under stress (i.e., "strain") than does a typical aggregate under the same stress. Accordingly, under tensile loading the cured Portland cement will tend to separate from a aggregate due to the relatively weak chemical bonds there between. Further, there is a notable difference in the coefficient of thermal expansion between cured Portland cement and the aggregate used therewith (with the cement having typically 10-20% greater coefficient over the aggregate), such that temperature cycling (such as freeze-that cycles) tend to pull the cured Portland concrete away from the aggregate.

A further disadvantage of Portland cement is that in creating Portland cement a large amount of carbon dioxide is released. (The typical manufacture of Portland cement is by heating calcium carbonate ($CaCO_3$—e.g., limestone) to obtain calcium oxide (CaO) according to the formula $CaCO_3 \Rightarrow CaO + CO_2$.) The carbon dioxide released to the atmosphere during the manufacture of Portland cement thus contributes to carbon dioxide greenhouse gasses in the environment. From 2013 through 2018 the annual global production of Portland cement was over 4 billion metric tons per year. This amounts to a release of 1.4 billion metric tons per year of $CO_2$—not to mention an estimated additional 900 million tons of $CO_2$ generated by the use of fossil fuels during the manufacture of the cement (e.g., for heating kilns, etc.). The manufacture of Portland cement is currently estimated to contribute as high as 8% of the annual total of $CO_2$ released to the atmosphere by industrial and energy sources.

Another disadvantage of Portland cement is that the cure time before the associated concrete product can be used (i.e., reaches its minimum design strength) is typically on the order of 14-28 days. During this time the resulting structure is typically not available for use, resulting in delay of implementation of the ultimate objective of the structure. For example, a Portland-cement based concrete road surface should preferably not be used for 2-4 weeks after being laid, thus denying users use of the road surface during this time. However, in order to avoid inconvenience to the public, such road surfaces are commonly made available to the public for use well before their preferred cure times, which can lead to degradation of the road surface.

Further, Portland-cement based concrete cannot be manufactured with high porosity (in order to reduce weight) without compromising the strength of the resulting concrete product. Likewise, Portland-cement based concrete typically has low permeability, and efforts to increase permeability result in an unacceptable loss in strength, especially if the permeability is achieved by using high water-to-cement ratios.

Another form of cement that is known is metal-oxide cements. Known metal oxide cements include aluminum, magnesium, zinc and zirconium based oxide cements. These metal oxide cements typically rely on the interaction of a metal oxide with an acid to form a solidified cement product. For example, magnesium phosphate cements are chemical cements that rely on the precipitation of insoluble magnesium phosphate from a mix of magnesium oxide and a soluble phosphate (i.e., from phosphoric acid). The metal oxides (such as magnesium, zinc or zirconium) will react with phosphoric acid at room temperature to form a coherent mass, setting quickly and giving high early strength. (This much is at least known from U.S. Patent Application Publication No. US 2017/0283322, which is hereby incorporated by reference herein.) Metal oxide cements (e.g., zinc oxide cement) are known for their use as dental cements, and, in the case of aluminum oxide cement, for their use in cementing wellbores in high-temperature oil and gas wells. (See "Aluminum phosphate cements help with deep, high-temperature wells", Arun S. Wagh, *Oil & Gas Journal*, May 15, 2006.) However, to date, metal-based cements have not been used to manufacture concrete products. This is perhaps due to the high cost of metal-based cements (relative to Portland cement), and the quick set time of metal-based cements (i.e., without the use of additional retarding agents).

Whatever the reason (or reasons), metal-based cements simply are not currently known for use in the manufacture of concrete products, either on a small scale (such as cast units—e.g., pavers and the like) or on a large scale (such as cast-in-place road surfaces).

BRIEF DESCRIPTION OF THE DRAWINGS

FIG. 6*a* is an end sectional view of a sump system that can be used in conjunction with the storm water runoff collection system of FIG. 4.

FIG. 6*b* is a side sectional view of the sump system of FIG. 6*a*.

FIG. 9 is an end sectional view of a street storm water runoff collection system that includes a porous, permeable cement water retention cell fabricated according to the methods provided for herein.

FIG. 9A is a side sectional view of a cast street panel that can be used in the street system of FIG. 9.

DETAILED DESCRIPTION

Figure 1:
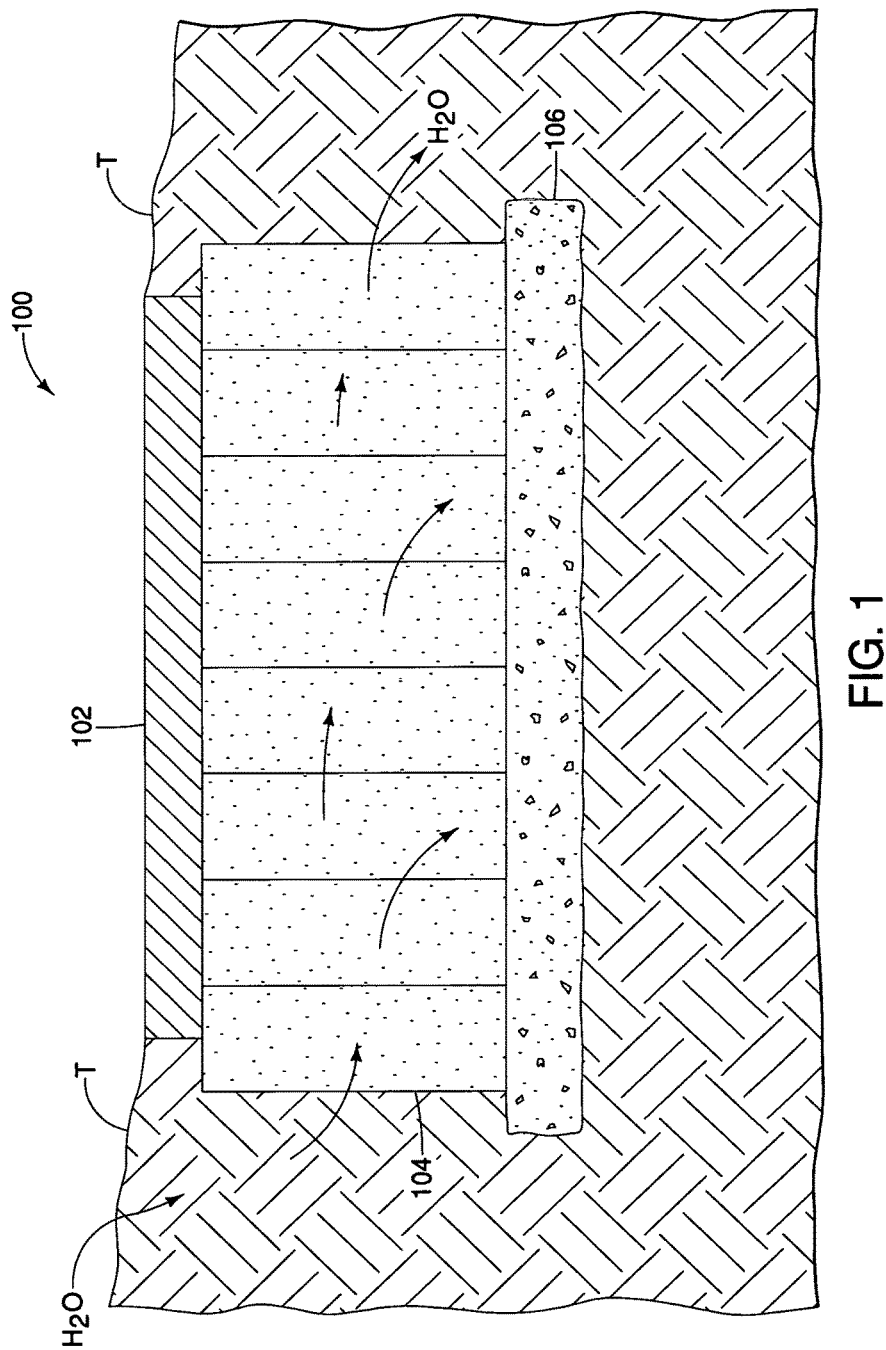
FIG. 1 is a cross sectional diagram of a road construction system that can use porous, permeable concrete units fabricated according to methods of the present disclosure.

In light of the "Background" information provided above, it is desirable to manufacture a concrete product using an alternative to Portland cement, and which addresses many of the shortcomings of Portland-cement based concrete products.

I have discovered new and useful methods for the manufacture of concrete products using metal-based cement as the cementing agent, as more specifically described below. More specifically, I have developed formulations and methods for chemically bonding metal-based cement with aggregate (as well as with reinforcing fibers and rods) at ambient temperatures in order to provide for the cast-in-place manufacture of metal-cement based concrete products. I have also developed formulations and methods for forming cast and/or extruded concrete building units using metal-based cements which can form the subject units at controlled elevated temperatures, but which are well below temperatures used in prior art for forming bricks and the like. Further, I have developed new and useful formulations and methods for using metal-based cement to manufacture unitized cast building units having porosity and permeability, and strength, beyond that achievable using Portland cement. The metal-cement based concrete products provided for herein also include materials which can be used for refractory purposes, such as furnace linings, and which require less energy to manufacture than prior art refractory materials, but are of at least equal quality.

The basic formulation for my metal-based-cement concrete is: (i) a metal-based cementing agent; (ii) a cement reacting agent; and (iii) an aggregate defined by an exposed surface area having one or both of metallic and silicone aggregate linking elements thereon which can chemically bond with the metal-based cementing agent via the cement reacting agent. (As described below, in the cement reacting agent can be acidic or basic.) In this way a superior concrete product is formed by way of chemically bonding the cement to the aggregate. That is, the concrete products of the present disclosure derive their strength not only from chemical bonds between the cement components themselves, but also from chemical bonds between the cement components and the aggregate. This is in contrast to prior-art Portland-cement based concrete products wherein the strength of the concrete product derives minimal strength as a result of any chemical bonding of the Portland cement to the aggregate. Further, the compressive strength of metal-based cements (about 30,000-50,000 psi) is much higher than the compressive strength of Portland cement (about 1500-14,000 psi), and is also much closer to the compressive strength of most aggregates (about 15,000-80,000 psi). Accordingly, a metal-cement-based concrete product will have a minimal compressive strength of about 15,000 psi (based on the minimal strength of the aggregate), as compared to a Portland-cement based concrete product which will have a maximum compressive strength of about 10,000 psi (based on the combination of the strength of the Portland cement, and interactions between the cement and the aggregate). More typically, the metal-cement-based concrete product provided for herein will have a minimal compressive strength of about 15,000 psi (based on the minimal strength of the aggregate and the cement), as compared to a typical strength of about 4000 psi for Portland-cement based concrete (based on the strength of the cement). (These figures assume that the concrete has low or no designed-in porosity.) Further, the stress/strain characteristics (as well as the coefficients of thermal expansion), of the cured cement, and the aggregate, in the metal-cement based concrete products provided for herein are much closer to one another than in Portland cement based concrete, thus reducing differential forces within the concrete during tensile loading (as well as thermal expansion/contraction).

Due to the wide variation of definitions of "cement" which are available, and in order to avoid confusion with those definitions for purposes of the following description, I will use herein the term "cement" to mean a solid product which is formed by the reaction of two or more chemical compounds, such chemical compounds to be identified herein as cement agents or "cementing agents". Accordingly, the cement agents will chemically react with one another to form a cohesive solid—i.e., cement. The cement can be an end product useful by itself—i.e., a cement product. An example of a cement product can be a solidified covering applied over a surface in order to seal or join the surface. Many cements have the properties of adhering to surfaces to which they are applied. A typical desired property of any cement is that the resulting solid cement exhibits the property of high compressive strength (relative to the intended application). A secondary desired property of any cement is that it exhibits the property of high tensile strength (again, relative to the intended application). A correlation of these two desired properties is that the cement chemically bind the cement agents together with strong chemical bonds in order to produce strength (compressive and/or tensile) in the resulting cement. Further, the cement agents can be combined with a filler (i.e., an aggregate) in order to produce a concrete product. Accordingly, a desirable property of the cement agents is that when they combine to form cement, they can also attach chemically to an included aggregate (or another cementing agent, and/or a reinforcing member) in order to form a concrete product. As with a cement product, the primary desirable property of a concrete product is compressive strength, followed by tensile strength. Additional desirable properties of both cement products and concrete products are: (i) resistance to deterioration of the strength of the products when exposed to chemical agents such as salts, acids and bases; and (ii) resistance to deterioration of the strength of the products when subjected to temperature variations. The latter consideration (temperature variation insensitivity) can be due to at least two circumstances. The first such circumstance can be fire (or other sources of high heat) which can cause the cement to chemically decompose. A second instance can be the result of permeability of the cement, which allows water to intrude into the cement and thus decompose during freeze-thaw cycles.

Beyond the strength considerations of cement described above, other desirable properties relate to the workability of the cement. That is, it is desirable that the cement (or cementing) agents be selected to allow the agents to be worked into the desired final form and density prior to solidification of the cementing agents. The primary consideration of workability of the cementing agents is the cure time—i.e., the time between mixing of the cementing agents and the solidification of the agents into cement. The cure time can be affected by a number of different factors, including: (i) the selection of the cementing agents; (ii) the temperature of the cementing agents during the curing reaction; and (iii) the conditions (other than temperature) under which the cementing agents are allowed to react. The third factor (i.e., non-thermal conditions under which the agents react) can be affected by the addition to the cementing agents of chemical accelerants or decelerants (i.e., to respectively accelerate or decelerate the chemical reaction of the cementing agents), as well as other factors such as the ambient atmosphere under which the reaction of the cementing agents is allowed to occur.

From the above discussion, it is apparent that an essential property of cementing agents is that they will cure (i.e., will chemically react with one another in order to form a solid product) when combined together under the desired conditions. To this end, I have not only developed novel formulations for the manufacture of metal-cement based concrete products, but I have also developed novel metal-based cements which use a metal-based cementing agent in combination with a reactive agent in order to produce cements which can be cured according to desired curing conditions. I have thus developed metal-based cementing agent combinations which allow for the production of cement and concrete products at ambient temperatures, as well as the production of cement and concrete products at elevated temperatures (and which are below temperatures used in prior art processes to manufacture products such as bricks and the like). The resulting cement and concrete products provided for herein exhibit superior strength, resistance to deterioration, and workability over prior art cements, and prior art cement and concrete products. I will now proceed to describe these formulations and methods in detail. In the following discussion, unless otherwise indicated, the term "concrete product" is meant to refer to the metal-cement based concrete products provided for herein.

I will now discuss each of the three primary components (i.e., the metal-based cementing agent, the cement reacting agent, and the aggregate) of the concrete product of the present disclosure in detail, followed by examples. In general, the concrete product of the present disclosure results from chemical bonds according to the structure of "Z-X-M-X—Z", wherein: (i) "Z" denotes a chemical element available on the aggregate which can bond with "X"; (ii) "X" denotes a chemical element which is present in the cement reacting agent; and (iii) "M" denotes a metal which is present in the metal-based cementing agent. (It will be observed that the "Z—X-M-X—Z" notation is a simplification for purposes of illustration, and does not include attached elements such as oxygen, hydrogen, etc. Further, while direct "Z—X" and "X-M" chemical bonds are preferable, some of the bonds formed may have intermediate oxygen bonds.) As but one non-limiting example (for purposes of illustration only), the metal-based cementing agent can be zinc oxide ((ZnO), wherein the metal "M" component is zinc (Zn)), the cement reacting agent can be phosphoric acid (($H_3PO_4$, wherein the "X" component is phosphorous (P)), and the element "Z" can be aluminum (Al). In this example the "Z—X-M-X—Z" bonds are "Al—P—Zn—P—Al". That is, the aluminum elements on the faces of the aggregate are covalently bonded to the metallic "M" element of the metal-based cementing agent by the "X" element of the cement reacting agent. Other examples of the "X" component can be sulfur and boron. It will be noted that the chemical reaction producing this result is an acid-base reaction resulting in strong covalent bonds (as distinguished from the hydration reaction which occurs in the manufacture of Portland cement concrete, and which produces relatively weak covalent bonds). Notably, in the hydration reaction for the curing of Portland cement, no bonding between the cement and the aggregate is necessary in order for the concrete formation process to occur. It will also be noted that in the formulation for forming concrete according to the present disclosure, there is no requirement for the addition of water to the mix materials. That is, while the addition of water is necessary in order for Portland cement to cure into a solid product, there is no requirement of water to be added to the mix components (metal-based cementing agent, cement reacting agent, and aggregate) of the present disclosure in order for them to form a concrete product. While in the above discussion the metal-based cementing agent, the reacting agent, and the aggregate are indicated as being joined by the "Z—X-M-X—Z" elements, the chemical bonds between these elements can be either direct bonds, or bonds facilitated by other elements (notably oxygen, hydrogen and/or sulfur). It will further be appreciated that the "Z" element does not need to be the same element in all positions in the "Z—X-M-X—Z" chain. For example, the structure can be "Al—P—Zn—P—Cd", where the "Z" element includes aluminum and cadmium. Additional "Z" elements can be included, depending on their availability in the aggregate, and their ability to form a bond with the "X" element in the cement reacting agent.

Metal-based cementing agent: The metal-based cementing agent provides a metal which forms a strong chemical bond (via the acid element "X") with the aggregate, thus binding the aggregate particles together (via the metal-based cement) into a concrete product. That is, unlike a Portland-cement-based concrete product wherein the chemical bonds between the cement and the aggregate are weak chemical bonds, in the metal-cement-based concrete of the present disclosure the chemical bonds between the cement and the aggregate are strong chemical bonds. The metal-based cementing agent can be a metal oxide, a metal peroxide, a metal hydroxide, a metal phosphate, a metal sulfide, a metal carbonate, a metal halide, and a metal organic. Metal sulfides, metal sulfates, metal nitrides and metal carbides are less preferred forms of the metal-based cementing agent, but can be used in selected formulations. Examples of metal oxides which can be used as the metal based cementing agent include zinc oxide (ZnO), palladium oxide (PdO), aluminum oxide ($Al_2O_3$), and silver oxide ($Ag_2O$). Other metal oxides can also be used, such as peroxides (e.g., $ZnO_2$). Examples of metal phosphates which can be used as the metal based cementing agent include zinc phosphate, magnesium phosphate, aluminum phosphate, and manganese phosphate. Other metal phosphates can also be used. Examples of metal carbonates which can be used as the metal based cementing agent include zinc carbonate ($ZnCO_3$), palladium carbonate ($PdCO_3$), and silver carbonate ($Ag_2CO_3$). Examples of metal halides which can be used as the metal based cementing agent include zinc chloride ($ZnCl_2$)), palladium chloride ($PdCl_2$), and aluminum chloride ($AlCl_3$). Examples of metal sulfides which can be used as the metal based cementing agent include zinc sulfide, lead sulfide and palladium sulfide. An example of a metal sulfate that can be used is $ZnSO_4$. Examples of metal organics include metal formates and metal acetates (e.g., lead formate and zinc acetate, respectively). Examples of metal hydroxides that can be used include magnesium hydroxide, aluminum hydroxide, zinc hydroxide and palladium hydroxide. The selection of any specific metal-based cementing agent will be primarily driven by the desired properties of the resulting concrete product, as described further below. While from the above it can be seen that many different metals can be used in different formulations in order to form the metal based cementing agent, certain metals are less desirable, such as iron, magnesium, lead and cadmium.

The metal-based cementing agent is preferably provided in a soluble form, such as zinc acetate (for example). The metal-based cementing agent can also be provided in a dry powder form, having a preferable size of about 100 nm or less. Ideally, the metal-based cementing agent is available for the reaction with the acid-based cement reacting agent on a molecular level (i.e., fully soluble) to maximize the number of bonds formed with the "X" element in the acid (indicated above)—i.e., the "M-X" bonds. By providing the metal-based cementing agent as a very fine powder, the acid can more easily dissolve the particles towards the molecular level.

One example of a metal chloride which can be used in the cement is palladium chloride ($PdCl_2$), and an acid which can be used with this metal carbonate is phosphoric acid ($H_3PO_4$). In this instance the reaction is

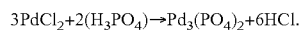

$$3PdCl_2+2(H_3PO_4) \rightarrow Pd_3(PO_4)_2+6HCl.$$

In this example the hydrochloric acid (HCl) is released from the cement as a gas. Since the free release of hydrochloric acid to the environment is typically something to be avoided, the use of metal chloride compounds in the formation of cement will preferably be used in a closed environment where the released hydrochloric acid can be captured. Put another way, metal chloride based cements will more commonly be used for the manufacture of unitized construction units (e.g., bricks and blocks) versus being used for cast-in-place applications (e.g., road surfaces, sidewalks, etc.)

Cement reacting agent. The cement reacting agent provides the "X" element (described above) for linking the metal "M" element in the metal-based cementing agent to the "Z" element on the face of the aggregate. The cement reacting agent can be provided in one of two forms: (i) as an acid-based cement reacting agent (i.e., having a pH of less than 7); or (ii) as a basic (i.e., non-acid) cement reacting agent (i.e., having a pH of greater than 7). I will discuss each of these two versions of the cement reacting agent in turn. In some formulations the "X" element can be provided by an intermediate agent, such as ammonium phosphate, which does not act as a cement reacting agent per-se, but contributes the phosphorous element to allow the bonding between the metal cement agent and the aggregate.

Acid-based cement reacting agent: The acid-based cement reacting agent provides an acid to electro-chemically reduce the bonding element ("Z") on the faces of the aggregate, as well as the metal in the metal-based cementing agent, to enable chemical linking of aggregate particles to one another by way of the metal in the metal-based cementing agent. This linking is facilitated by the "X" element in the acid (indicated above). The acid-based cement reacting agent is of the form $H_nXO_m$, wherein "X" is preferably selected from group consisting of phosphorous, sulfur, carbon and boron, and "n" and "m" are selected to form an acid when in combination with "X" (as described more fully below). The acid-based cement reacting agent can be, for example, a phosphoric acid, a boric acid, a sulfuric acid, and a hydrochloric acid. Other forms for the cement reacting agent are described below. The acid-based cement reacting agent can also be a derivative of any of the aforementioned acids, such as sulfurous acid. In the example wherein the acid-based cement reacting agent is phosphoric acid ($H_3PO_4$), then following the general form indicated above (i.e., "$H_nXO_m$"), "X" is "P" (phosphorous), "n"=3, and "m"=4. Other derivative acids can be acids with less acidic cations, such as sodium, ammonium ($NH_4$), and potassium, (generally of the form "$H_{n-1}Y_iXO_m$", wherein "Y" denotes an alkali (e.g., potassium, sodium), an amine group (e.g., $NH_4$), or an organic group such as a methyl or ethyl group). The acid-based cement reacting agent can be provided in a dry form or in a liquid form. An example of a dry acid is $P_2O_5$ (diphosphorus pentoxide), which will form phosphoric acid when mixed with water. Another example of a dry acid is $P_4O_{10}$. The selection of the specific acid-based cement reacting agent to be used in the formulation of a concrete product is primarily driven by the ability of the "X" component in the acid to chemically bond with the "Z" component on a face of the aggregate, as well as to the metal "M" component in the metal-based cementing agent, as further discussed below. Acid-based cement reacting agents having higher pH values (e.g., a pH of 2 to 3) are generally preferable over lower pH acids (e.g., pH of 1 to 2), not only for reacting purposes but also for safety of handling during mixing of the concrete mix components.

As indicated above, the acid-based cement reacting agent can be either provided in a liquid (soluble, or anhydrous) form, or in a dry form. Using a liquid (or soluble) form will generally improve the completeness of the chemical reactions (i.e., with the cementing agent and the aggregate) when mixing the components together, due to the freer availability of the "X" element in a molecular solution. When the acid-based cement reacting agent is a liquid, it can be mixed with the aggregate first, and then the cementing agent can be added at the time when curing is desired. Preferably, a liquid acid-based cement reacting agent is added to a pre-mixture of all of the dry components (e.g., aggregate, cementing agent and any reinforcing fibers). However, by providing the acid-based cement reacting agent in a dry form, the curing reaction can be deferred until a desired time, at which point water (or another selected liquid) can be added to the mixture of materials in order to initiate the curing process. When the acid-based cement reacting agent is provided in a dry form, it is preferably provided as a powder, and with a size of preferably less than 100 nm. As with the metal-based cementing agent, the acid-based cement reacting agent is ideally provided on a molecular level to maximize the number of bonds formed with the "M" component of the metal-based cementing agent, and the "Z" component in the aggregate (i.e., the "M-X—Z" bonds).

In addition to providing the "X" element which links the metal molecule in the metal-based cementing agent to the aggregate, the acid-based cement reacting agent can also function to put the linking element on the face of the aggregate into a condition to bond with the "X" element (as described further below). Accordingly, it can be advantageous in certain mixtures to use a combination of a least two acid-based cement reacting agents—one to first prepare the aggregate for linking, and a second to provide the linking "X" component. Further, the term "acid-based cement reacting agent" should be understood to include not only acids, but also compounds that become acidic once combined with one or more of the metal-based cement concrete components. The term also includes Lewis acids, hydrogen peroxide, and metal peroxides.

Regarding the freezing point of the acid-based cementing agent, the term "freezing point" should be considered as that temperature above which all of the components of the acid (in an anhydrous state) are in solution, and not in a solid or crystalline form. For example, according to this definition, the freezing point of certain acids relevant to the present disclosure are as follow: (i) the freezing point for phosphoric acid is about 11° F. (30 C); (ii) the freezing point for sulfuric acid is about 50 F (10 C); (iii) the freezing point for carbonic acid is about 32 F (0 C); and (iv) the freezing point for hydrochloric acid is about −51 F (−46 C). However, these freezing points can be much lower when the acid is in a water solution. Accordingly, selecting an acid-based cementing agent for an ambient cast-in-place application should consider these freezing points. However, while this list of freezing points of acid-based cementing agents which can be used to formulate cast-in-place concrete products according to the present disclosure might seem to be determinative in selecting the acid-based cementing agent to be used, this will not always be the case. For example, while the use of hydrochloric acid as the acid-based cementing agent for cast-in-place applications can be desirable due to its low freezing point, this is a less preferable acid to use as the cement reacting agent since it generally does not result in high-strength bonds between the metal-based cement agent and the aggregate.

Basic cement reacting agents. As indicated above, the cement reacting agent can be acidic (discussed immediately above) or basic (i.e., a pH of greater than 7). Examples of the cement reacting agent that can be used which might be considered as basic (i.e., low or weak acidity) include sodium phosphate ($Na_3PO_4$), ammonium phosphate variants (e.g., $(NH_4)_3PO_4$), $(NH_4)H_2PO_4$), or $(NH_4)_2HPO_4$)), triethyl phosphate $((C_2H_5)_3PO_4)$, and ethyl acetate ($C_4H_8O_2$, or $CH_3COOC_2H_5$) from reacting zinc acetate and triethyl phosphate. Exemplary metal-based cement agents which can be used with these weak acid cement reacting agents include zinc acetate and zinc formate. The byproducts of the cement agent and the cement reacting agent when using these non-acid (or weak acid) variants can include ammonium carbonate and ammonium formate, which will typically form a solid at ambient temperatures (and can thus be extracted later by heating the concrete product to a temperature of between 136 F to 250 F). Of note, the byproducts using these formulations do not include water, and thus set times can be quicker (and concrete product formulation temperatures can be lower). One disadvantage of using a weak acid (or basic) cement reacting agent is that etching on the faces of the aggregate can be reduced over the use of a stronger acid, thus decreasing bonding between the cement and the aggregate.

Aggregate: The aggregate used for the concrete products provided for herein is selected to have on the faces thereof one or more elements (designated by the letter "Z") which, under the influence of the cement reacting agent, will form a strong chemical bond with the "X" component of the cement reacting agent. As discussed above, in the formulation of Portland-cement based concrete little consideration is given to selecting an aggregate which can chemically bond with the Portland cement. Rather, when formulating Portland-cement concrete consideration is primarily given to the geometry of the aggregate, and specifically to providing an aggregate which can interfere with sheering forces within the cured cement when subjected to mechanical stress. (As indicated above, in Portland-cement concrete bonds between the cement and the aggregate are not strong, and are subject to failure due to differential stress/strain properties of the cured Portland cement and the aggregate.) While mechanical interference with sheering forces resulting from the presence of the aggregate in formulations of concrete products according to the present disclosure is still a desirable trait, the more desirable trait of aggregates used in the formulations provided for herein is the ability to chemically bond with the "X" component in the cement reacting agent. Preferably, aggregates which can be used in concrete formulations provided for herein have a metal element (which I will designate generically as "M2"), a silicon atom (Si), or a combination thereof, on the face of the aggregate. Preferable "M2" metals include aluminum and zinc. Generally, metals on the faces of the aggregate particles provide better bonding sites, but certain exceptions exist (as described more fully below). The "M2" metal element on the face of the aggregate, as well as the silicon atom, will typically be initially chemically inert. For example, any metal "M2" elements on the face of the aggregate may be in the form of an oxidized metal. Likewise, silicon atoms on the face of the aggregate may be present in the form of an oxide. However, when the faces of the aggregate are placed in contact with the cement reacting agent, the metal-oxides (and silicon oxides, and the like) on the faces of the aggregate will become chemically active such that they can chemically bond with the "X" element in the reacting agent. The aggregate can be naturally sourced (e.g., from naturally occurring rock), as well as from rough-processed rock deposits (e.g., mine tailings) and highly-processed minerals (e.g., silica gel). When the aggregate contains a large amount of silicon on the particle faces, then the chemical bonding performance of the aggregate (i.e., bonding with the metal-based cement) can be enhanced by preparing (i.e., washing) the aggregate with an etchant, such as potassium hydroxide. As indicated earlier, while silicon is generally a less preferable aggregate bonding element, in the case of a synthesized aggregate (e.g., silica gel), or metal silicate molecules (such as zinc silicate) it can result in an extremity strong and chemical inert concrete product. Silica gel is an amorphous and porous form of silicon dioxide, and as such will allow the metal-based cement to penetrate into the aggregate particle, thus forming more bonds between the cement and the aggregate. When the aggregate is naturally occurring (e.g., gravel, rock, etc.), then some pre-processing (such as crushing, washing, etc., described more fully below) can be provided to enhance the performance of the aggregate in the final concrete product. The aggregate can also be a mixture of a naturally occurring aggregate, a rough-processed aggregate, and/or a synthetic aggregate. The aggregate can also be, or include, recycled metal-based cements, and metal-cement based concrete, assuming the final desired properties of the concrete product are not compromised (strength-wise, or otherwise) by the properties (size, strength, permeability, etc.) of the recycled cement and/or concrete used for (or as part of) the aggregate. Recycled Portland cement concretes should be avoided as a source of aggregate due to the reaction with, and consumption of, the acid-based metal cement reacting agent. Further, aggregates with significant carbonate content should be avoided for the same reason.

A preferred source of the aggregate for use in forming concrete products according to the present disclosure is mine tailings. Mine tailings are typically rich in the "M2" metal elements which can chemically bond with the "X" element in the cement reacting agent. Further, a preferred particle size for the aggregate is between 50 and 200 mesh. More preferably, the aggregate includes particles of various sizes between the 50 and 200 mesh range. When mine tailings are used for the aggregate it is desirable to screen out particles larger than 50 mesh, and particles small than 200 mesh. Particles larger than about 50 mesh can be reduced in size to the desired range by crushing, grinding or other mechanical processes. However, when the cementing agent is provided in a soluble form, then it can be desirable that the aggregate is provided in size down to the molecular level (such as when silica gel is used for the aggregate).

The aggregate used in the formulation of concrete products provided for herein will typically be sourced from crustal rock (i.e., rock extracted from the crust of the Earth). Crustal rock is abundant in aluminum silicate, and thus the "M2" element in the aggregate will typically be aluminum. However, as indicated above, mine tailings can include additional "M2" metal elements, such as Au, Ag, Sn, Cd, Cu, Ni, Mn, Pb, Pt, Pd, Zn and Fe. The selection of the aggregate to be used in forming concrete products according to the present disclosure is driven primarily by the desired concrete product to be formed. As described further below, the desired concrete product drives the selection of the aggregate, which in turn drives the selection of the metal-based cementing agent and the cement reacting agent. As indicated above, certain metals in the aggregate (such as iron) do not form the strong chemical bonds which are an objective of the concrete provided for herein. However, the presence of these metals in an available aggregate cannot always be avoided, and so a certain amount can be tolerated so long as the desired physical properties (e.g., strength, chemical resistance, porosity, etc.) of the final concrete product are not compromised.

Liquids. While, as indicated above, the addition of water is not necessary in order to promote the chemical reaction between the three primary components (i.e., the metal-based cementing agent, the cement reacting agent, and the aggregate) in order to result in a concrete product according to the present disclosure, there can still be advantages to adding a liquid to the primary mix components for purposes of: (i) workability (i.e., being able to place the mix components into the desired final form prior to solidification); (ii) facilitating chemical contact of the mix components with one another in order to increase the efficiency of the chemical reactions (i.e., increase the percent of the mix components which will chemically react with one another); (iii) acting as a solvent to place certain soluble solid mix components into a liquid solution (e.g., dry acid to liquid acid); (iv) acting as a retardant to increase the working time of the mix components prior to solidification; and (v) increasing porosity (and/or permeability) of the resulting concrete product. Accordingly, it can be desirable to add a liquid to the mix components, either to initiate the reaction of the metal-based cement agents with one another, as a supplemental component to affect end properties, and/or to provide for flexibility in mixing and curing of the primary components. One liquid which can be added to the mix components is water. Another liquid which can be added to the mix components is a solvent. Examples of solvents that can be used as additive liquids include alcohols, as well as other organic compounds (such as xylene, naphtha, acetone, dimethyl sulfoxide, etc.). The selection of the liquid which can be added to the mix components for the concrete product is based on the ability of the liquid to perform the desired function—e.g., workability, contact facilitation, retarding or accelerating solidification, and/or formation of porosity/permeability. When selecting the liquid (if any) to be added to the mix components, considerations such as vapor pressure, surface tension and chemical activity are to be taken into account. For example, if enabling contact between the mix components is a consideration, then a liquid having a low surface tension (such as an alcohol) is desirable. Likewise, if retarding the reaction rate of the cement bonding process is a consideration, then a liquid having a low vapor pressure and being generally non-reactive with the other mix components is desirable. In general, any liquid added to the mix components will be expelled from the mix components during the curing process (i.e., they will not chemically bond with the other mix components in order to form the resulting concrete product). However, certain liquids can evolve in a vapor form during the curing process, and can become entrapped in the resulting concrete product. These entrapped vapors (resulting from the addition of a liquid to the mix materials) can thus produce voids in the resulting concrete product (i.e., porosity), as well as channels in the resulting concrete product (i.e., permeability).

When the concrete products of the present disclosure are formed as unitized cast (or extruded) units, the formed units can be formed in a vacuum environment, and/or an elevated temperature environment, in order to encourage the removal of any added liquids. More specifically, any added liquid, and the vacuum/temperature of the curing environment, can be selected to achieve desired properties in the resulting concrete product. For example, if porosity (and/or permeability) is a desired property of the resulting concrete product, then any added liquid to the mix materials should be selected to evolve from the mix materials in a vapor form during the curing process in order to form the desired voids and channels in the final concrete product, or be forced out after curing by the use of vacuum or pressure. In general, any liquid added to the mix components should preferably be selected to not form substitute chemical bonds between the metal-based cementing agent, the cement reacting agent, and the aggregate, as this will tend to weaken the strength of the resulting concrete product. However, in some instances it can be desirable for any added liquid to react with one of more of the mix components—for example, ethyl alcohol added to form ethyl acetate, in conjunction with alcohol, which can then evaporate, thus removing excess acetate.

Selection of the concrete components. As indicated above, the metal-based cement concrete products provided for herein are formed at least from the combination of mix components of: (i) a metal-based cement agent; (ii) a cement reacting agent; and (iii) an aggregate. The selection of the mix components used to form a concrete product according to the present disclosure is primarily driven by the desired properties of the concrete product to be formed, and the conditions under which the concrete product is to be formed. The first criteria (i.e. the desired properties of concrete product to be formed) mostly includes the properties of strength, durability (chemical and mechanical), and porosity and permeability. The second criteria (i.e., the conditions under which the concrete product is to be formed) mostly includes the option of cast-in-place formation of the concrete product versus unitized casting, or extruding, of the concrete product. Additional considerations can include cure time and other tertiary factors. Once these criteria for the final concrete product to be formed have been determined, the selection of the mix components starts with the selection of the aggregate. The aggregate is primarily selected based on the availability of "M2" elements, or silicon elements, on the faces of the aggregate in order to form strong chemical bonds, and thus produce a concrete product having high mechanical strength. The process of selecting an aggregate can be performed by testing different aggregate candidates from among different sources. Each aggregate candidate can be tested for the presence of "M2" and/or silicon bonding elements in order to determine its potential to be used as an aggregate. Common testing techniques include x-ray diffraction, ICP (inductively coupled plasma atomic emission spectrometry) and titration. Once a suitable aggregate is identified (i.e., an aggregate having the desired "Z" element available on the face of the aggregate), then the next step is to select the cement reacting agent having an "X" element which can form a chemical bond with the "Z" element in the aggregate. In general, it is preferable to select a cement reacting agent which includes a "X" element which forms a strong insoluble chemical bond with the "M2" (or Si) "Z" element in the aggregate. Then, based on the selection of the cement reacting agent, a metal-based cementing agent is selected which preferably forms a strong chemical bond between the "M" metal element in the metal-based cementing agent and the "X" element in the cement reacting agent. Additionally, the "X" element can be chosen for a second purpose of making certain metal sulfides or aramides unreactive, thus rendering mine tailings more suitable as an aggregate source.

The first consideration when selecting the mix components for the metal-based cement concrete product is whether the concrete product will be cast-in-place (i.e., cast at the location, and in the position, where the final concrete product is desired), or whether the concrete product can be unit-cast, and then subsequently moved to the desired location where the final concrete product is desired. In the first instance (cast-in-place formation), the primary consideration is the available temperature. The typical cast-in-place scenario is casting in an outdoor environment, where temperatures can vary widely. For example, if the cast-in-place concrete product is a bridge support column, then ambient curing temperatures can vary from freezing (i.e., 32 F), or below, to over 100 F. Construction of cast-in-place concrete is frequently scheduled for favorable curing temperatures, even when using Portland-cement. Portland cement-based concrete products are rarely cast at temperatures below 40 F since the water in the mixture—essential for the hydration reaction—must remain liquid. Similarly, metal-based cements generally favor higher curing temperatures. However, I have developed formulations (discussed in more detail below) for metal-cement concrete products which can be cast-in-place at temperatures as low as 25 F, and even lower. The minimal cure temperature for metal-cement-based concrete products is driven primarily by avoiding freezing of the liquid acid component, as well as any added liquids and any liquids produced as a result of the cement forming and concrete forming reactions. For example, formulations which produce, as a byproduct, ethyl acetate or ammonium acetate (as discussed elsewhere herein) can be used at temperatures of at least as low as 32 F since the freezing point of these compounds is below the freezing point of water. It will be appreciated that formulations provided for herein for metal-cement-based concrete which is cast-in-place and cured at ambient temperature can also be used to produce unitized construction blocks and the like at ambient temperatures (i.e., not all unitized concrete products formed and cured according to the current methods need to be cured at elevated temperatures in order to achieve full strength). Cast-in-place construction of concrete using metal-based cements, as well a low-temperature casting of concrete products, is discussed more fully below.

As described above, concrete made using a metal-based cement is superior to concrete made using Portland cement since the compressive and rupture strength of the cement component in the concrete is much closer to the compressive and rupture strength of the aggregate when the cement is metal-based. Accordingly, it is desirable to have a high bond strength between the cement and the aggregate when using metal-based cements in the manufacture of concrete products, and thus it is further desirable to select a metal-based cement which will react (i.e., bond with) the selected aggregate. For example, when the aggregate is silica based (such as sand), then a preferable metal-based cement can be a metal phosphate cement, since phosphate ions (freed during the reacting of the cement agents) will easily bond to the silica in the aggregate. As another example, when the aggregate is clay, then a preferred metal-based cement can be an aluminum hydroxide ($AlH_3O_3$) cement, thus creating metal-phospho-silicate bonds between the cement and the clay aggregate particles. Since creating the cement-to-aggregate bonds is essential to overall strength of the resulting concrete product, it is desirable to provide sufficient cementing agent to coat the faces of the aggregate. Accordingly, when calculating the percent of cement to be added to the aggregate, the surface area of a unit volume of aggregate can be estimated, and then the amount of cement needed to wet this surface area calculated based on tests to determine the wetting ability of the selected cement for the selected aggregate, especially considering how soluble the cementing agent is in the cement reacting agent and solvent combination used. In selecting an aggregate (including clay) to be used with the metal-based cements to form concrete products, it can be desirable to select the aggregate from a source which contains residual metal elements—for example, crushed rock from mine tailings. These residual metals in the aggregate can react with the cement reacting agent, thus creating more bonds between the cement and the aggregate. For example, when the reacting agent is phosphoric acid, then metal phosphates are formed. (For example, if the aggregate includes lead residue, then excess phosphoric acid will react to form lead phosphate—$Pb_3(PO_4)_2$.) The formed metal phosphates are very stable and resistant to decomposition when exposed to slightly acid or basic conditions (such as can exist where the concrete product is specifically located). This results in an additional benefit—i.e., that the residual metals in the aggregate will be prevented from leaching from the concrete product when in use. This allows aggregates to be sourced from materials which would otherwise be unacceptable for use in Portland-cement-based concrete.

Regarding unitized casting of metal-cement based concrete products, this option allows the use of an oven (or kiln) to raise the curing temperature, thus facilitating a greater selection of the metal-based cement over cast-in-place options. Further, while prior-art formation of cast construction units (such as bricks and the like) require kilning at temperatures of around 1500 F and above (in order to sinter elements to one another), formulations of the metal-cement based concrete products provided for herein are heated to at most about 500 F in order to facilitate curing of the cement, as well as increasing the potential for making the "X" elements in the cement reacting agent bond with the "Z" element in the aggregate. Of note, while Portland-cement unitized concrete products can be cured at temperatures of between 70 F and 250 F, this does nothing to increase the resulting strength of the final concrete product, but only serves to reduce the curing time. On the other hand, for selected formulations of the metal-cement based concrete products provided for herein, providing a curing temperature of between 70 F and 250 F can greatly increase the strength of the final concrete product (i.e., over a Portland-cement cast concrete unit cured at the same temperature). Further, as discussed more fully below, the present disclosure allows for the formation of concrete products having high porosity, and high permeability, and these products are preferably formed as unitized cast units which are cured at temperatures of between 100 F and 500 F.

Formulations. In general, the concrete products provided for herein are formulated from the above described components in the following amounts. For the metal-based cement agent, typically between about 2% to about 25% by weight of the total mass of the mix components; for the cement reacting agent, the amount is based on achieving a stoichiometric ratio for bonding with the metal-based cementing agent; and for the aggregate, whatever is left to add up to 100% total weight of the mix components (typically between about 96% and 70% by weight of the total mass of the mix components). As indicated above, supplemental liquids can be added for various reasons, and this can amount to anywhere from between 0% and about 25% by weight of the total mass of the mix components.

As described above, the selection of components to be used in forming the metal-cement-based concrete products provided for herein is driven primarily by the end product to be achieved, not only mechanical properties, but conditions under which the concrete product is to be formed (i.e., cast-in-place or unitized casting or extrusion).

Aggregate preparation: The metal-cement based concrete products provided for herein form their greatest strength when there is maximal bonding of the aggregate to the cement. (Recall that Portland cement based concrete derives maximal strength not from bonding with the aggregate, but from the aggregate interfering with shearing of the cured Portland cement under stress.) Accordingly, it is desirable to provide the aggregate in small particles in order to increase the opportunity for the metal-based cement to bond with the aggregate. Preferably, the aggregate is of a mesh size of between 50 and 200 mesh. Aggregate particles of greater than a mesh size of 200 (about 74 microns) are typically not desirable because they increase the required amount of metal cement to an unacceptable level (based on economics—but, as indicated above, in certain instances it can be desirable, and economic, to provide the aggregate on a molecular-size level). That is, the cost of the metal cement will typically be about 10 times (or more) than the cost of the aggregate, and thus it is desirable to minimize the amount of metal-based cement used (and thus maximize the amount of aggregate used), while still achieving the desired mechanical properties (typically, compressive strength) of the resulting concrete product. Accordingly, when selecting the aggregate size, the primary considerations are: (i) the desired end strength of the resulting concrete product; (ii) the availability of a suitable aggregate; and (iii) the cost of forming the concrete product. (In some instances strength may be a secondary consideration, such as when porosity and/or permeability are more important, or when resistance to chemical degradation is more important.) Regarding the second consideration (i.e., availability of a suitable aggregate), this consideration links closely to the third consideration—i.e., cost (or more generally, economics). For example, a locally available aggregate may be less preferable (from a strength standpoint) than an aggregate which requires transport to the site of formation of the concrete product, but the cost of transporting the preferred aggregate to the site of formation can exceed the desired cost of forming the concrete products. In this case, it can be preferable to use the locally available aggregate, but crush it to a finer grade in order to increase the bonding between the metal-based cement and the aggregate. Of course, this is a balance of costs between increasing the amount of the metal-based cement to be used, and the cost of transporting a preferred aggregate to the site of formation of the concrete product. The solution to the selection of the aggregate to be used, and the mesh size of the aggregate to be used (and in light of the desired strength of the concrete product to be formed), can be derived mathematically. For example, an equation for the selection of the aggregate can be generally determined as "AGG=function of: (i) the desired strength of the resulting concrete product; (ii) the strength of the final concrete product that can be achieved by different available aggregates; (iii) the cost for each different available aggregate (including transportation costs); and (iv) the amount (and thus, cost) of the metal-based cement to be used with each different available aggregate." In the foregoing formulation, "AGG" indicates the specific kind, and size, of an aggregate to be used in the formulation of a desired metal-cement based concrete product. (Other considerations can also be included in this calculation.) Rather than formulating a single equation for the selection of the aggregate, the selection can be determined by solutions of simultaneous equations, selecting min/max ranges for each desired property (e.g., strength, cost, etc.), and then solving for solutions which satisfy the selected ranges for the desired properties. Typically, the selected properties will be in competition with one another (e.g., strength versus permeability), or will be scaled differently, and at some point (based on various alternative and available scenarios) an analytical solution will be revealed which results in an optimum selection. This can require weighing the considerations (i.e., applying factors to each consideration), and performing multiple calculations based on different potential scenarios. While solving this equation (or equations) mathematically in order to achieve the best selection of materials is ideal, in many cases the solution will be driven primarily by the local availability of an aggregate, the strength of a desired concrete end-product which can be formed using the locally available aggregate, and the availability (and cost) of a metal-based cement which will satisfactorily react with the locally available aggregate.

As indicated above, a primary source for the aggregate can be mine tailings. Mine tailings are generally the discarded mineral ore after the desired minerals (typically metals as metal sulfides and metal oxides) have been extracted from the mineral ore by one or more processes (typically, extraction by flotation or acid leaching). Mineral ore is typically processed to extract one, or perhaps two or even three, selected metals (or other components) from the ore, thus leaving behind other elements which are not economically practical for extraction. Thus, mine tailings can be relatively rich in metallic components (i.e., the "Z" or "M2" element in the aggregate) for purposes of bonding to the "X" element in the cement reacting agent, but which are not present in sufficient quantity to economically justify extraction from the mineral ore. Mine tailings from different mines can be combined for use as the aggregate in order to increase the availability of different "Z" elements in forming the "Z—X-M-X—Z" concrete structure (described above). As indicated above, the "Z" element does not need to be the same element in all positions in this chain. When using mine tailings as a source for aggregate, certain considerations may need to be addressed. One consideration is in removing particles from the tailings which are over-sized or under-sized (according to the above discussion regarding aggregate particle size). A second consideration is that mine tailings (which are typically aggregated into a heap—i.e., a generally conical pile) can, over time, accumulate what is generally known as "slimes" between the tailing particles. These "slimes" can include viscous mud, as well as jarosite. Whatever the origin, these "slimes" in mine tailings can inhibit the chemical bonding between the cement reacting agent and the aggregate. Accordingly, when using mine tailings as an aggregate, it is desirable to remove these slimes" from mine tailings before using them as an aggregate. One method for removing "slimes" from mine-tailing sourced aggregate is to first wash the mine tailings with an acid (such as sulfuric acid or phosphoric acid). It will be noted that the washing of mine-tailing based aggregate with an acid (such as sulfuric acid or phosphoric acid) can replace, at least in part, the addition of an acid-based cement reacting agent when formulating a concrete product according to the present disclosure. For example, a mine tailing source (or combination) can be treated with sulfuric acid ($H_2SO_4$) having a pH of 1-2 for a period of 4-8 hours, and then rinsed with water before being used as the aggregate in order to form a concrete product according to the present disclosure.

Once an aggregate is selected (based on whatever criteria is used, as discussed above), then the next step is to prepare the aggregate for use as a mix material in the metal-based cement concrete product to be formed. The preparation of the aggregate can include the following steps: (i) screening the aggregate to segregate the desired particle sized aggregate from over- and under-sized aggregate particles; (ii) crushing over-sized aggregate particles in order to produce desirable sized aggregate particles; (iii) washing the aggregate to remove undesirable fines which may be present in the aggregate; and (iv) washing the aggregate particles with an acid in order to expose chemically reactive metal elements on the faces of the aggregate which can then more freely react with the metal-based cementing agent. A fifth step of drying, or wetting, the aggregate in order to achieve a desired water/solvent content for desired aggregate moisture level can also be performed.

Mixing of Components: The present disclosure provides for two distinct methods for mixing the mix components in order to form a concrete product. The primary difference between the two methods is whether the cementing agent is added before the cement reacting agent, or the other way around. Basically, once the cement components are added together the cement starts to cure (unless both cement components are initially added in a dry form), so any aggregate or other additives need to be mixed before the reactive cementing components are added together (or before any liquid intended to initiate the reaction between the two agents is added). In the preferred embodiment the cement components are both provided (ultimately) in the form of a liquid, which maximizes contact between molecules of the cement agent and molecules of the cement reacting agent. While both the cement agent, and the cement reacting agent, can be added initially to the mixture of concrete components in a dry form, this is a less preferred arrangement because: (i) the components will not be as evenly distributed in combination as if they were both provided in a liquid form; and (ii) in some combinations when the cement reacting agent is provided in a dry form (e.g., $P_2O_5$), it can release a significant amount of energy when water or another solvent is added to the mixture of the components.

In a first embodiment of a method for mixing components for the formulation of a concrete product as provided for herein, the metal-based cementing agent is provided in a liquid soluble form, and is preferably placed in a liquid form (i.e., in solution) prior to the addition of the cement reacting agent. The liquid soluble cement agent can be placed in solution before being mixed with the aggregate, or afterwards. One example of a liquid soluble cement agent is zinc formate ($C_2H_2O_4Zn$), which is a solid powder at ambient conditions, and is typically soluble in water at ambient temperatures. Next, the cementing agent is mixed with the aggregate. (Any preparation of the aggregate—such as grading, washing, etc.—is performed prior to mixing the aggregate with the cementing agent.) Once the cementing agent and the aggregate are mixed, then the cement reacting agent—preferably in a liquid form—is added to the mixture. The reasons for using a liquid cement reacting agent are: (i) better distribution of the cement reacting agent (versus a solid, which can clump); and (ii) less energy is released from an acid-based cementing agent when it is in a liquid form as opposed to a dry form (such as, for example, $P_2O_5$). Also, at this time, or prior to adding the cement reacting agent, additive components (such as accelerants, decelerants, etc.) can be added to the mixture of the cement agent and the aggregate.

As an alternative embodiment, the three primary components (cementing agent, cement reacting agent, and aggregate) can all be mixed together using dry components. It will be noted that this mixture is still a dry mixture, and free anions have not yet been provided in order to allow a dry acid (or base) cement reacting agent component to react with the metal-based cementing agent. Preferably the mixing of the three dry components (metal-based cementing agent, cement reacting agent, and aggregate) is performed in a dry atmosphere due to the generally hydroscopic nature of the cement reacting agent. (Note that the dry metal-based cementing agent and the dry cement reacting agent can be mixed together prior to being mixed with the aggregate, or all three components can be mixed together at the same time.) It is preferable to mix the aggregate with only one of the metal-based cementing agent or the cement reacting agent prior to adding the third component in order to decrease the potential for the metal-based-cementing agent and the cement reacting agent to react with one another in the presence of any incidental water, such as ambient humidity or the like. Assuming the metal-cement components are initially added in a dry form, then the third step is to add water (or another selected liquid) to the mixture, and then mix the four components well in order to initiate the chemical reaction between the metal cement components. Preferably the water (or other liquid) is added while the dry metal-based cementing agent, the dry cement reacting agent and the aggregate are being further mixed. The resulting combination produces a wet mixture which will solidify into a solid concrete product as the metal-based cementing agent, the cement reacting agent, and the aggregate react with one another and cure to form the end concrete product. Before allowing the cementing agents to cure, the wet concrete can be poured (i.e., cast-in-place), placed into a mold, or extruded, in order to produce the desired end concrete product. As indicated above, this alternative embodiment (i.e., of using dry metal-based cementing agents in the initial mix, versus using liquid formulations of these components) is less preferred due to the amount of energy which can be released by using a dry form of the cement reacting agent.

Accordingly, an exemplary embodiment for a method of mixing the components to form a metal-cement based concrete product is as follows:
(i) Provide the metal-base cementing agent in the form of a soluble dry powder.
(ii) Mix the dry powder metal-base cementing agent with a solvent (e.g., water) to place the metal-based cementing agent into a liquid solution.
(iii) Provide the cement reacting agent in the form of a liquid.
(iv) Provide the aggregate (including any preparation, such as grading, washing, etc.).
(v) Mix the liquid solution of the metal-based cementing agent and the aggregate together.
(vi) Add the liquid cement reacting agent to the mixture of the liquid metal-based cementing agent and the solid aggregate, and mix the three components. (At this time, any additional liquids such as accelerants, decelerants, etc. can be added as well.)
(vii) Place the mixture of the metal-based cementing agent, the cement reacting agent, the aggregate and the water (or other selected liquid) into the desired form (i.e., cast-in-place, or unitized forming).
(viii) Provide any supplemental processes (e.g., heating, vacuum, etc.) in order to drive the formed mixture of components into the final desired concrete product.

As indicated, the above method is one example only. There are a number of variations that can be performed, all within the scope of mixing the three basic components in order to produce a concrete product. For example, another embodiment of mixing the components for the formulation of the concrete products provided for herein is to first mix the metal-based cementing agent in a dry form with the aggregate, and then to add (and mix) the cement reacting agent in an anhydrous form (i.e., a liquid form) to the dry mixture of the metal-based cementing agent and the aggregate (along with any other dry components, such as setting agents and accelerators (or decelerators)). In this second embodiment the anhydrous cement reacting agent will immediately begin the curing process, and so forming of the final concrete product preferably begins shortly following addition (and mixing) of the anhydrous cement reacting agent with the mixture of the metal-based cementing agent and the aggregate. For cast-in-place applications of the concrete product, the aggregate, metal cement agent (either in liquid or dry form), and any supplemental liquids can be pre-mixed at a plant, then transferred to the location where the casting is to take place, at which time the metal cement reacting agent (preferably in liquid form) can be added, and mixed with the other components, prior to casting the concrete.

The above example of mixing the components for the metal-cement based concrete can also include adding excess of the cement reacting agent, and/or adding hydrogen peroxide ($H_2O_2$) (to decrease pH of the mixture), thus dissolving the metal cement agent and preparing the faces of the aggregate (by acid etching). In this variation the excess acid is reacted with a curing agent (accelerator), as will be described in more detail below.

As further described herein, the general methods described above can include additional steps such as heating the mixture of components, placing the mixture of components in a vacuum (or in a pressure chamber) during curing, and washing (rinsing) the concrete product after curing to remove residual water soluble byproducts (such as acetates) to open up channels for permeability. As will be appreciated, formulations in controlled environments (typically, for unit-cast or extruded concrete product) allow for the recovery of gasses which can evolve during the curing process, such as vaporous hydrochloric acid.

As indicated above and elsewhere herein, different desired properties of the resulting metal-cement based concrete product can be achieved by selecting specific variations of the components. Desired properties for the concrete product can include such things as compressive strength, curing time and temperature, and permeability. For example, the selection of the metal-based cementing agent—e.g., metal formate versus metal halide, zinc formate versus lead formate—can depend on the desired properties for the concrete product, but all such cementing agents are within the scope of the present disclosure.

Formation of Concrete Products: As indicated above, concrete products provided for herein using metal-based cements can be produced either as cast-in-place concrete products, or as unitized cast (or extruded) products. By their very definition, cast-in-place concrete structures are cast in the place of their final desired position or location. Examples of cast-in-place concrete structures include road surfaces, support columns, dams, and structural building foundations, and are typically 6 inches or more in thickness. By comparison, unitized cast structures are typically cast at a location remote from their final intended position, and are then subsequently transported to their final desired position or location following sufficient cure time to allow them to be put in place. As will be appreciated, cast-in-place formation of concrete products is typically dependent on ambient conditions (typically temperature and humidity) of the casting site to provide the conditions necessary for achieving the desired properties of the resulting concrete product. By contrast, unitized cast (and extruded) structures can be formed under controlled conditions (e.g., temperature and pressure) which are not available at the desired final locus of placement. While unitized cast concrete products can be formed at ambient temperatures, the use of a controlled environment for unitized cast or extruded concrete products allows for a greater range of metal-based cements and additives to be used, with increased assurance of the properties for the final concrete product. Accordingly, the following discussion is separated into two parts—casting in ambient conditions, and casting in controlled environment conditions.

Ambient-condition formation of concrete products. While ambient-condition casting of concrete products using metal-based cements will typically pertain to cast-in-place formation, the following discussion can also apply to unitized product formation. As described above, the primary considerations (beyond product strength) when selecting metal-based cements for cast-in-place concrete formulations include the freezing point of any liquids used in the formulation of, or derived during the curing of, the concrete product. Specifically, if the concrete product is to be cast at temperatures below about 40 F, then it is desirable that water not be used, or derived, in order to prevent the freezing thereof which can damage the concrete product. For most acid reactions (i.e., the reactions between an acid-based cement reacting agent and the metal-based cementing agent, as well as with the aggregate), water is a byproduct. For example, if the metal-base cementing agent is palladium carbonate ($3PdCO_3$), and the acid based cementing agent is phosphoric acid ($H_3PO_4$), then in this instance the reaction is:

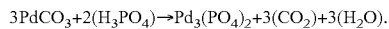
$3PdCO_3 + 2(H_3PO_4) \rightarrow Pd_3(PO_4)_2 + 3(CO_2) + 3(H_2O)$.

In this example the carbon dioxide is released from the concrete product as a gas, and the water is released either as a gas or a liquid, or a combination thereof. In any event, if the temperature of the mix components falls below 32 F before the concrete product is cured, the water released by the reaction can freeze and cause fractures. However, one advantage of using metal-based cements in the production of concreted products is the quick cure time. Thus, if the mix components for a cast-in place formation are mixed in a heated plant to a temperature of 65 F (for example) prior to being transported to the casting location (where the temperature can be below 32 F), then the cement can be fully cured before the temperature of the mix components drops below 32 F due to ambient cooling. Of course, when relying on the temperature of the mix components to keep any generated water in a liquid form prior to curing of the cement, the ambient temperature needs to be considered, as well as: (i) the temperature of the mix components at the time of casting; and (ii) the cure time for the selected cement components. Rather than relying on making difficult thermodynamic calculations to allow for casting of water-containing metal-cement concrete products at temperatures below 32 F, safe-harbor is to limit the formation of such products to ambient temperatures above 32 F. However, special formulations can allow for formation of concrete products at temperatures below 32 F, as described in the next paragraph.

Low-temperature formulations. In order to allow metal-cement based concrete products to be formed (typically, cast-in-place) at temperatures below 32 F, certain formulations of the mix products can be used. A first technique is to add to the concrete mix components a supplemental liquid which will lower the freezing point of any water initially present within the mix components (or water generated as a result of the cement curing reaction). The supplemental liquid selected to lower the freezing point of the water should be selected so that it does not chemically bond with the metal-based cementing agent or the cement reacting agent, which would prevent the formation of the cement bonds. Examples of supplemental liquids which can be used to lower the freezing point for any water present in the concrete product mix components include ethylene glycol and ethyl alcohol. The quantity of supplemental liquid added to the mix components to lower the freezing point of any present water can be calculated based on the known amounts of water (both initially present and to be generated) in the mix components, and using freezing point data for combinations of the supplemental liquid and water. For example, a combination of 20% ethylene glycol and 80% water (by volume) will lower the freezing point of the solution to about 18 F. Using this first technique, it is possible to form cast concrete products using metal-based cements at temperatures of −20 F, or even lower. However, one drawback to this first technique is that the mixture of water and supplemental liquid will be retained in the final concrete product, thus reducing the strength of the concrete product. A second technique (similar to the first technique) is to select a metal-based cementing agent that will produce a salt which, when in solution with the water present in the mixture, will lower the freezing point of the water. For example, if the metal-based cementing agent is a sulfate (e.g., zinc sulfate), then the reaction with the acid reacting component can produce a sulfate salt, which in solution with water will lower the freezing point of the water. A third technique is to select the cementing components such that: (i) the cement reacting agent component is not provided in any anhydrous form; and (ii) the by-product of the reaction does not produce water. One example is the use of zinc formate ($C_2H_2O_4Zn$) as the metal-based cementing agent. In this example an acid-based cement reacting agent can be phosphoric acid, and the byproduct of the cement curing reaction is not the formation of water, but rather the formation of formic acid. Another example is the use of zinc acetate as the cement agent, and ammonium phosphate or ethyl phosphate as the cement reacting agent.

Controlled environment formation of concrete products. As described above, when forming metal-cement concrete products, the use of a controlled environment in the formation process can allow for the production of concrete products having superior properties over prior art concrete products. The use of a controlled environment in the formation of concrete products is typically impracticable for cast-in-place concrete products, due to the difficulty of arranging for a controlled environment. That is, while a controlled environment for cast-in-place formation of concrete product can be achieved, the cost for doing so can outweigh the advantages. For example, a controlled environment for cast-in-place formation of a concrete product can be achieved by: (i) tenting an area where the casting is to be placed, and providing heating and perhaps vacuum control under the tented area; and (ii) placing heating elements into the volumetric area where the casting is to take place in advance of the casting. It will be appreciated that these measures will typically be cost prohibitive, but they can be provided if circumstances warrant the cost. Accordingly, the following discussion will pertain mostly to the formation of concrete produces by unitized casting and extrusion in a controlled environment.

A first technique for casting metal-cement based concrete products in a controlled environment is heating cast units (or extruded product) in an oven in order to drive off liquids and/or gasses from the concrete product mix during the cement curing process. Oven heating of the units can also be used to react excess cement reacting agent with hydroxide ($OH^-$) agents, such as clay, aluminum hydroxide ($Al(OH)_3$) or iron magnetite ($Fe_3O_4$). (By "excess" I here mean beyond a stoichometric balance with the metal cement agent provided.) The primary objective here is to eliminate those liquid and gaseous components from the mix components, and reaction products, which can otherwise reduce the strength of the resulting concrete product if they remain in the final concrete product. (As described below, this technique can also be used to produce porosity and permeability in the final concrete product, and so the specific formulations used to form the concrete product, and the temperatures to which they are subjected in an oven, can produce different concrete products—everything from a very dense concrete product with high strength, to a less dense concrete product having lower strength.) When the objective is to remove water from the final concrete product, adding heat (by way of an oven) will cause the water in the outer portions of the concrete product to open up passageways such that water vapor from the inner portions of the concrete product can then move outward and be removed from the concrete product. Of course, it is desirable that the oven temperature be selected such that the outer portions of the concrete product do not cure (and close off water vapor passageways) before water vapor from the inner portions can be released from the concrete product. Accordingly, the oven temperature for forming concrete products can constitute a heating regimen, consisting of a first temperature (of about 220-250 F) to drive off water from the concrete products, and then a secondary higher temperature (of between about 300-500 F) in order to facilitate curing of the cement in the concrete product. The selection of the higher temperature for curing the metal-based cement in the concrete product will depend on the specific components selected for the metal-based cement used. In one variation the oven temperature for curing the concrete products can be between 150 degrees F. and 210 degrees F. This lower temperature range facilitates removal of water without boiling the water, which can potentially damage the concrete product before it is fully cured.

A second technique for casting metal-cement based concrete products in a controlled environment is placing cast units (or extruded product) in a vacuum controlled environment in order to extract liquids and gasses from the concrete product mix during the cement curing process. The primary difference between this second (vacuum) technique and the first (oven) technique is that the vacuum technique does not require the addition of heat in order to facilitate the remove of undesirable gasses and liquids from the concrete product mix. As will be appreciated, the reaction of the metal-based cementing agent and the acid-based cementing agent is accelerated by the addition of heat, and so providing a vacuum environment to the mix components does not provide an accelerating heat component. That is, providing a vacuum environment to the mix components facilitates in the removal of gasses and liquids which can compromise the strength of the final concrete product, while not accelerating the reaction rate for curing of the cement. Thus, the vacuum environment technique allows for more undesirable gasses and liquids to be removed from the final concrete product than does curing in an oven environment. As with the oven technique for curing metal-cement based concrete products, the selection of a vacuum to be provided during curing of the metal-based cement in the concrete product will depend on the specific components selected for the metal-based cement used. An exemplary range of for vacuum curing the concrete products is 1-2 psi below atmospheric pressure.

A third technique for casting metal-cement based concrete products in a controlled environment is placing cast units (or extruded units) of the concrete product in a combined vacuum and temperature controlled environment in order to extract undesirable liquids and gasses from the concrete product mix during the cement curing process, while at the same time controlling the rate of curing of the concrete product by controlling the temperature. This third technique provides a high degree of flexibility to achieve the desired properties of the final concrete product. For example, where strength of the final concrete product is the ultimate objective, then the concrete unit can be formed under a vacuum and temperature selected to allow a high level of removal of gasses and liquids over a long curing period for the cement. Curing too fast (by providing a high curing temperature) can result in trapped gasses and liquids in the final concrete product, thus resulting in a loss of strength. Curing too slow (by providing a low curing temperature) will also result in trapped liquids and gasses—i.e., not enough heat to drive them out of the concrete product. A high vacuum will remove gasses and liquids from the concrete mix components, but removing them too soon can have a deleterious effect on the ultimate strength of the concrete product (i.e., by removing reaction components before they have had a chance to react). But a low vacuum can result in insufficient removal of gasses and liquids from the concrete product, thus compromising the integrity of the final concrete product. Further driving the selection of temperature and/or vacuum to be applied to a metal-cement based concrete product mix is the selection of the mix components—i.e., the metal-based cementing agent, the cement reacting agent, and the aggregate. As indicated above, the primary driver in selecting the mix components for a metal-cement based concrete product is the properties of the desired final product. That is, the selection of the materials and process to be used in formulating the final concrete product will be driven by: (i) the desired properties of the concrete product; and (ii) the costs (in materials and the formulation processes) in producing the desired concrete product. As indicated above, the optimization of achieving these two parameters can be achieved by solving known mathematical equations to seek a desirable solution (using known min/max mathematical methods, and simultaneous solutions where two or more equations are required to accurately model the properties and economics of the product formulation), and in particular by limiting the maximum and minimum parameters for each attribute, and then overlaying the results in order to obtain best options.

Alternative embodiment: In another alternative embodiment for forming concrete products using metal-based cements, the metal-based cementing agent is provided in the form of a metal formate, the cement reacting agent is one of phosphoric acid or sulfuric acid, and the aggregate is defined by an exposed surface area having metallic linking elements thereon in the form of metallic compounds (such as metal oxides and/or metal sulfates) which will react in the presence of the acid-based cement reacting agent to thereby bond with the "X" component of the acid-based cement reacting agent. When the acid-based cement reacting agent is phosphoric acid or sulfuric acid, then the "X" component is respectively phosphorous or sulfur. The metal formate can be, for example, zinc formate ($C_2H_2O_4Zn$), lead formate ($C_2H_2O_4Pb$), or formates of the metals cobalt, nickel and silver. Further, the bulk of the aggregate is preferably in the form of aluminosilicates (including metal silicates) which are generally insoluble in weak acids. Preferably, the aggregate includes about 5% (by weight) of metals, and between 50 to 90% (by weight) of metal silicates. Further, the metallic linking elements on the surfaces of the aggregate preferably include 50% or more (by weight) of aluminum, iron, zinc, lead, palladium, gold, copper, nickel, cobalt, palladium, or combinations thereof. A useful aggregate for this formulation is mine tailings, prepared to the size range described above. The metal-based cementing agent is provided in the range of between 2 to 25% of the total dry weight of components of the mixture, with the remainder of the dry weight components being mostly (or all) aggregate. The acid-based cement reacting agent is provided in a quantity to achieve stoichiometric balance with the available metals on the aggregate such that there is ideally little to no free (i.e., surplus) "X" component present in the formed concrete product. As indicated in the example below, the acid-based cement reacting agent can be provided in a dry form, and then an activating liquid can be added to the mixture of components to place the dry-form acid-based cement reacting agent into a reactive state so that acidification of the metallic compounds on the surfaces of the aggregate can take place. Examples of liquids that can be added to activate the dry-form acid-based cement reacting agent (i.e., activating liquids) include water, formic acid, acetic acid and hydrogen peroxide.

In one example of this embodiment the metal-based cementing agent is zinc formate, the acid-based cement reacting agent is phosphoric acid, and the aggregate is mine tailings having zinc and/or aluminum (generically, "M2") as the metal in the metallic compounds on the surfaces thereof. The aggregate preferably includes about 20% by weight of the metallic compounds, and is graded to 100% passing 50 mesh, and 75% passing 150 mesh. The zinc formate is provided in the amount of between 2.5% and 25% of the total weight of the metallic compounds in the aggregate. The phosphoric acid is provided in the form $P_2O_5$ (phosphorus pentoxide), which is a dry form of the acid, and is provided in the amount of 2-20% of the aggregate weight. The zinc formate and aggregate are first blended together, and then the dry-form phosphoric acid (i.e., the phosphorus pentoxide) is added and mixed with the zinc formate and aggregate. In this example the activating liquid is 5-25% (by weight of the aggregate) of water, which is then blended into the mixture of components. The water not only places the dry phosphorus pentoxide into the form of liquid phosphoric acid, but also reacts with the formates (in the zinc formate) to produce formic acid. The formic acid reacts with the metallic compounds on the faces (surfaces) of the aggregate, placing them in a state to bond with the phosphorous from the phosphoric acid. It will also be noted that in forming the formic acid from the formate available from the zinc formate, the zinc is thus freed so that it also can also bond to the phosphorous. The bonding process then proceeds to bond the "M2" metal on surface of the aggregate to the zinc, thus forming a Zn—P-M2 cement bond, with the remainder of the aggregate (still bound to the M2 metals) forming a concrete product. More preferably, the metal-based cement components are first placed in a liquid form (using the dry-weight percentages indicated above) prior to being combined with one another, and the aggregate, in order to increase molecular contact, and to better manage control of exothermic reactions when combining the cement reacting agent with the other components.

In one variation, the metal-based cementing agent can further include a metal carbonate (e.g., zinc carbonate, $ZnCO_3$). In this instance the by-products in forming the concrete product can include carbon dioxide, which can be useful in forming voids (and thus, porosity and permeability) in the resulting concrete product. Carbon dioxide can also be generated using metal formates alone (i.e., without the addition of a carbonate compound), but typically the mix components will need to be heated in order to cause the formates to form carbon dioxide.

In this embodiment, the reactions between the metal formate cementing agent, the phosphorus pentoxide, the water, and the metallic compounds on the surfaces of the aggregate produce by-products such as water and/or carbon dioxide, which are not chemically bound to the concrete product, and can thus be removed in order to form porosity and permeability in the resulting concrete product. For example, when the concrete product is cast-in-place, and the process is performed in temperatures above freezing (i.e., above 32 F), then excess water can gravity drain from the formed concrete product, thus leaving voids for porosity and permeability. By providing excess water, more voids can be created, but at the expense of compressive strength of the resulting concrete product (not just from the presence of voids, but also due to pH reduction, and thus reduced freeing of "M2" metals on the aggregate to bond with the "X" component of the acid component (i.e., cement reacting agent)). It will thus be appreciated that if it is an objective to form a concrete product having porosity and/or permeability, the ambient conditions for curing the cement in the concrete product will be a significant consideration. When the concrete product is to be formed as a cast-in-place unit, then ambient temperature is the primary driver when considering how to formulate the final concrete product in order to achieve porosity and permeability, and further in light of the desired strength to be obtained. In this instance it can be desirable to provide more components which result in the generation of $CO_2$ as a by-product, as $CO_2$ will remain in a gas state well below the freezing temperature of water, and thus can evolve from the forming concrete product, thus resulting in a concrete product having desired properties of porosity and permeability. However, when the concrete product is to be formed as unit-cast product in a controlled environment, then much more latitude is provided in the way of selecting how to formulate the final concrete product in order to achieve porosity and permeability. More specifically, a controlled environment allows excess water (and/or $CO_2$) to be removed by heat and/or a partial vacuum, thus allowing greater permeability to be achieved with less reduction in compressive strength. In general, the degree of porosity and permeability that can be achieved when casting concrete product in ambient conditions, and without significantly compromising strength of the product, is limited by those conditions. On the other hand, when curing conditions can be controlled (e.g., conditions such as temperature and pressure), then the characteristics of the concrete product (e.g., porosity, strength) can be controlled to a much higher degree. The formulation for a concrete product manufactured according to the present disclosure will depend on: (i) the final desired compressive strength of the resulting concrete product; (ii) the desired porosity/permeability of the resulting concrete product; and (iii) the conditions under which the final concrete product is to be formed. It will be appreciated that these are competing considerations, and that the specific formulation should be derived in light of these competing considerations, within the limits of what can be achieved. As a general guide, the methods provided for herein allow for: (i) the production of cast-in-place concrete products having high compressive strength, but low porosity and permeability; and (ii) the production of unit-cast concrete products under controlled environmental conditions which result in both high compressive strength, as well as higher values (versus cast-in-place formulations) of porosity and permeability.

Further alternative embodiment: In yet a further embodiment, a metal-cement-based concrete product can be manufactured using mine tailings from metal ore mining as both the aggregate and the metal-based cementing agent. Such tailings typically have residual metals on the faces (exposed surfaces) of the particles, and which can act in essentially the same manner as the metal(s) in the metal-based cementing agent. That is, the metals in the mine tailings aggregate can act as the metal-cement base, at least in part. Typical residual metals found in metal ore mine tailings include zinc, aluminum and lead. Further, such mine tailings typically include a large quantity of silicates which are tightly chemically bonded to the residual metals. By first mixing the metal-containing mine tailings with formic acid (or another carboxylic acid such as acetic acid), and subsequently adding phosphoric acid (or alternately, sulfuric acid) as the acid-based cement reacting agent, a metal-phosphosilicate (or, in the case of sulfuric acid, a metal-sulfide-silicate) concrete is formed. Preferably, the acid-based cement reacting agent is provided to the mix in a liquid form, such as anhydrous phosphoric acid. More specifically, by first adding the carboxylic acid to the metal-containing mine tailings, a carbon atom will attach to the metal molecule on the surface of the mine tailing particle. This then allows the phosphoric acid to substitute a phosphorous atom for the carbon atom, creating the metal-phosphorous bond, and releasing the previously attached carbon atom in the form of $CO_2$ (due to the presence of available oxygen from the phosphoric acid).

In one example of this embodiment, the aggregate is provided as mine tailings having the chemical and mechanical (i.e., size) properties as provided for in the alternative embodiment described above. That is, the aggregate comprises mine tailings having metallic compounds on the faces thereof, which can react with formic acid to place the metals (from the metallic compounds) in a state where they can then react with phosphoric acid, forming a strong chemical bond which results in a concrete product linking particles of the mine-tailing aggregate by a phosphorous atom. In this example the aggregate (mine tailings) are first mixed with phosphoric acid. Thereafter, formic acid (in a liquid form) is added to the mixture, and is blended to form a slurry which can then be cast (either in-place, or in a form). The liquid formic acid not only provides an activating agent to place the metal compounds on the faces of the aggregate into a state in which they can then bond with the phosphorous of the phosphoric acid, but also acts to free the phosphorous from the phosphoric acid. Further, the liquid formic acid provides a liquid which facilitates in the dry aggregate and liquid phosphoric acid pentoxide being placed into a workable form so that the combination of components (aggregate, phosphoric acid and formic acid) can be cast into the desired shape for the resulting concrete product. Further, to facilitate workability of the constituent components, additional supplemental liquids can be added to the mixture. Examples of such supplemental liquids can include water, as well as accelerants (such as methyl phosphate ($CH_3O_4P^{-2}$) and/or ethyl phosphate ($C_6H_{15}O_4P$), as described below with respect to accelerants which can be used to shorten curing times of the concrete products provided for herein). In one example the aggregate comprises at least 85% of metal silicate, with metallic linking elements on the exposed surface area of the aggregate in the form of metal oxides and/or metal silicates.

Porous/permeable concrete formulations. In addition to providing enhanced strength and resistance to strength deterioration over prior art formulations for cement and concrete products, the metal-based cement concrete products provided for herein also allow for engineered properties of porosity and permeability. It can be desirable to increase porosity of cement and concrete products for the purpose of reducing weight of the concrete product. It can also be desirable to increase the permeability of cement and concrete products for the purpose of allowing water to flow through the concrete product. Likewise, it can be desirable to decrease the permeability of cement and concrete products for the purpose of preventing the flow of water through the concrete product. To that end, I have developed methods and formulations for adjusting the porosity and permeability of metal-based cements and concrete products in order to achieve the desired associated properties. It is desirable to be able to adjust the porosity and permeability (or lack thereof) in cement and concrete products for a number of reasons. First of all, by increasing porosity, the density of the concrete product is reduced. This can be desirable where weight is an issue—for example, when the concrete product is used as a bridge deck. Second of all, porosity in concrete provides elasticity to the concrete product, thus adding resistance to fracturing from freeze-thaw cycles. However, as porosity reduces compressive strength, any designed-in porosity must not result in a concrete product which has a lower-than-desired compressive strength. With respect to permeability, permeability can be a desired characteristic of a concrete product where it is desirable that the concrete product allow water to flow through it to prevent accumulation of water, or where acting as a drain tile or the like.

With respect to the formulations of metallic carbonate cements, porosity and permeability can be provided for in concrete products by providing excess of the metal-based cement agent (i.e., excess over the stoichiometric balance needed to bind the aggregate) so that excess carbon dioxide is released, thus causing voids (i.e., porosity) and, where the excess $CO_2$ is allowed to be released from the curing concrete product, permeability. An example of this is the use of excess $PdCO_3$ in the reaction with phosphoric acid according to the following equation:

$$3PdCO_3 + 2(H_3PO_4) \rightarrow Pd_3(PO_4)_2 + 3(CO_2) + 3(H_2O).$$

This method is preferable for forming cast-in-place concrete products where the curing of the concrete can be performed at ambient temperatures, but requires addition of more of the typically more expensive metal cementing agent.

A second method for creating porosity and permeability using a metal-carbonate cement is by using excess of the cement reacting agent. For example, according to the above equation, if excess phosphoric acid ($H_3PO_4$) is used, then this results in the formation of diphosphorus pentoxide ($P_2O_5$), which can then be sublimed from its solid form to a vapor which can produce the desired porosity/permeability in the resulting concrete product. However, to get the solid diphosphorus pentoxide to sublime the concrete product must be subject to higher-than-ambient temperatures (e.g., about 644 F), and thus this method is more suited to the formation of unitized concrete products (such as blocks and the like).

A further method of creating permeability in the concrete product using metal-based cements is by providing an anion which will vaporize (from a liquid) or sublime (from a solid) and thus create voids in the resulting concrete product. One example of this method is by using a metal chloride cement such that the chloride provides a free chlorine atom which can act as the ion. For example, using aluminum chloride as the metal-based cementing agent, and phosphoric acid as the cement reacting agent, the following reaction occurs:

$$AlCl_3 + H_3PO_4 \rightarrow AlPO_4 + 3HCl.$$

In this instance the chlorine is released as gaseous hydrochloric acid (HCl), which can form voids in the resulting concrete product. For the specific reaction provided above, heat must be added (e.g., heating to a temperature of 70 F), and thus this method is better suited for the manufacture of unitized concrete products where the units can be heated if ambient temperatures are less than 70 F. Further, performing this method in an oven allows the gaseous hydrochloric acid to be recovered, versus being released to the atmosphere. By adjusting the amount of cementing agents, more or less HCl can be generated. When sufficient of the metal chloride cementing agents are added, then the released hydrochloric acid is sufficient to transpire from the forming concrete product, thus forming channels for permeability. This method is particularly well suited for the manufacture of drainage tiles designed to allow water to pass through the tile, rather than run off of the tile.

Another method for creating porosity/permeability in the concrete products provided for herein is available when the metal-based cement agent is provided as a formate or an acetate. In this case the reaction with the cement reacting agent can produce a solid byproduct within the concrete product, such as sodium acetate or ammonium acetate, for example. These organic byproducts are water soluble, and can then be removed from the final (cured) concrete product by flushing water (preferably warm water) through the concrete product. After the byproducts (organic and/or inorganic) are solubilized and rinsed from the concrete product, the remaining voids can provide porosity and permeability. The extent of the porosity/permeability achieved using this technique can be varied by adding more of the cement components to the concrete mixture, thus increasing the quantity of the byproducts generated.

One example of a metal carbonate which can be used in the cement is palladium carbonate ($PdCO_3$), and an acid which can be used with this metal carbonate is phosphoric acid ($H_3PO_4$). In this instance the reaction is

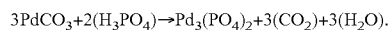
$$3PdCO_3 + 2(H_3PO_4) \rightarrow Pd_3(PO_4)_2 + 3(CO_2) + 3(H_2O).$$

In this example the carbon dioxide is released from the cement as a gas, and the water is released either as a gas or a liquid, or a combination thereof. As described herein, by entrapping some of the released carbon dioxide within the solid cement product, porosity can be achieved within the end product. Further, by allowing some of the carbon dioxide to escape at a controlled rate, the end product can be configured to have a desired permeability. Methods for adjusting the release of the carbon dioxide to achieve porosity and/or permeability were described above regarding curing the concrete product under controlled conditions of temperature and/or vacuum.

Yet another method for achieving porosity and/or permeability in the metal cement-based concrete product provided for herein. The method (to be described below) also provides for improved bonds between the aggregate and the metal-cement for improved strength. As described above, aggregates proposed for use herein can oftentimes be defined by two or more different types of metal being present on the faces of the aggregate, as well as silicon. As also described above, certain metals make better (stronger) bonds with the cement reacting agent than do other metals. By etching the faces of the aggregate prior to forming the bonds with the metal cement reacting agent, a selected (desired) metal element can be attached to the faces of the aggregate, thus creating a uniform metal environment over the surface of the aggregate. In general the method includes using a first acid to etch the aggregate, and a second acid to form the bonds between the etched aggregate and the metal component of the metal cement. The first acid decays into gaseous products which are preferably evolved from (i.e., removed from) the forming concrete product, which can produce porosity and permeability in the end product. The first acid is selected to slowly decay during the cement curing process, freeing up the selected (desired) metal in the metal cement to react with the second acid. This method can also be described as precoating the aggregate with the selected metal since the etched surfaces of the aggregate will bond with the provided metal from the metal-cement. This method typically employs the step of heating the concrete mix to elevated temperatures (well above atmospheric temperatures) and thus is more suited to fabricating cast concrete units such as blocks, pavers, beams, etc. I will now describe some specific examples of this method.

In a first example of the method described immediately above, the selected metal for making the bonds to (and between) the aggregate is zinc, the first acid is sulfuric acid ($H_2SO_4$), and the second acid is phosphoric acid ($H_3PO_4$). In this example the metal-based cementing agent is provided in two parts—the first part being a metal oxide, and the second part being a metal sulfate to provide the basis for the first acid (here, sulfuric acid). More specifically, the first part of the metal-based cementing agent is zinc oxide (ZnO), and the second part is an aqueous liquid solution of zinc sulfate ($ZnSO_4$). The aggregate is preferably a metals-containing aggregate, such as from mine tailings (as described elsewhere herein). The following example provides quantities of mix components for a sample of concrete product, which can be scaled up accordingly for commercial quantities. In this example the mix components were as follows:

As metal-based cementing agent first part: ZnO (8 g);
As metal-based cementing agent second part: $ZnSO_4$ (8 g in 100 ml $H_2O$);
As metal-cement reacting agent: $H_3PO_4$ (10 g of 85% solution);
As supplemental liquid: $H_2O$ (~15 g);
As aggregate: mine tailings, between 0.125 in diameter and 150 mesh, evenly distributed (200 g); and
As reinforcing material: chopped glass fibers, 8 mm in length (4 g).

The mix components were then mixed and processed as follows:

Mix reinforcing fibers and aggregate.
Mix first and second parts of metal-based cementing agent to aggregate mix.
Add metal-cement reacting agent solution and water ($H_2O$) to mixture.
Mix all components together until desired level of workability of concrete mixture is achieved— additional liquid water can be added to achieve desired workability.
Place mix components in a mold. (Once placed in mold, the mixture can be vibrated to remove entrained air.)
Place mold in drying oven and dry at 190 F until molded concrete unit retains shape.
Cure molded concrete unit in oven at 450 F for one hour per inch of thickness.

In one variation of the above example, the mix components can also include an oxidizer. One exemplary oxidizer is hydrogen peroxide ($H_2O_2$). The oxidizer produces an oxidizing agent which facilitates in the etching of the faces of the aggregate. When hydrogen peroxide is used as the oxidizer in example provided above, the reaction is:

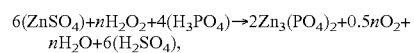
$$6(ZnSO_4) + nH_2O_2 + 4(H_3PO_4) \rightarrow 2Zn_3(PO_4)_2 + 0.5nO_2 + nH_2O + 6(H_2SO_4),$$

where "n" (italicized) is selected to achieve initially mostly $H_2SO_5$ from $H_2SO_4 + H_2O_2$. The addition of the oxidizer (here, hydrogen peroxide in this reaction) not only etches the faces of the aggregate, but also facilitates maintaining an acid condition of the phosphates until the sulfuric acid ($H_2SO_4$) is driven off (in the oven curing step). That is, the reaction of the zinc phosphate will occur in a slowly decaying acid environment, with $H_2SO_5$ (peroxymonosulfuric acid, also known Caro's acid) being formed and consumed as an intermediate reaction product. It will be noted that the reaction products include molecular oxygen ($O_2$), which can either be evolved in from the mix products at ambient temperature (i.e., prior to any oven drying of the cast concrete unit), or entrained, depending on the viscosity of the wet (i.e., pre-cured) concrete. In the event that the molecular oxygen is evolved, there will be very little porosity obtained as a result of the molecular oxygen. Further, as the sulfuric acid has a boiling point of 638 F, it tends to sublime at the lower oven curing temperature of 450 F, and thus as the sulfuric acid is released from the concrete mix components during curing, porosity and permeability in the end concrete product can be achieved. The mix components can further include a small amount (~1% total mass of the concrete mix) of calcium hydroxide ($Ca(OH)_2$) which can react out excess sulfuric acid from the curing concrete product.

As indicated, the method described above results in the generation of sulfuric acid ($H_2SO_4$) vapor, and since the method is typically practiced in a closed environment the off-gassing sulfuric acid can be recovered for later industrial use. One such use is in making sulfur-based plant fertilizers, such as ammonium sulfate. In this secondary process the recovered sulfuric acid can be infused into water to produce a wet acid product. This wet acid can then be neutralized (e.g., by the addition of ammonium hydroxide), and then treated with a carbonate salt (e.g., potassium carbonate—$K_2CO_3$) to produce potassium sulfate ($K_2SO_4$). The potassium sulfate can then be used in other industrial processes (e.g., as fertilizer).

Excess acid neutralization variation for creating porosity and permeability via dehydration reaction. A still further variation for creating porosity and permeability in metal-cement based concrete products is to provide excess acid, either as excess of the acid-based cement reacting agent or as another acid. Further, along with adding (or forming within the chemical reactions) excess acid, porosity and permeability are increased by the addition of an additive component which provides a hydroxide ($OH^-$) group (as described further below). Examples of this additive component include talc (i.e., hydrated magnesium silicate—$Mg_3Si_4O_{12}$), EPK (Edgar Plastic Kaolin) clay (97% Kaolinite—$Al_2O_3$, $2SiO_2$, and $2H_2O$), feldspars (such as Custer feldspar), bauxite, aluminum oxide and magnetite ($Fe_3O_4$). The metal-based cementing agent is preferably provided as a metal oxide and/or a metal peroxide. The addition of excess acid (esp., excess acid-based cement reacting agent) serves at least two purposes: (i) it places the metal-based cementing agent into solution (i.e., a liquid form); and (ii) it acid etches the faces of the aggregate to expose more of the metal components in the aggregate for chemical reacting to bind with the metal cement agents. Putting the metal-based cementing agent in solution provides for: (i) increased contact between the metal cementing agent and the aggregate, (ii) ease of workability of the concrete mixture (e.g., placing the mixture into molds), and (iii) secondary cementing reactions with metals in the hydroxide-supplying additives (EPK clay and/or talc). An additional benefit of providing surplus acid in the mix components is that it raises the chemical reaction temperature of the hydroxide-supplying additives (EPK clay and/or talc) above ambient so that curing time of the concrete product can be more closely controlled in a temperature controlled environment (such as an oven). Of course, when excess acid is provided in the mix components, it is desirable to react the excess acid which, if left in the final concrete product, can degrade the product. The hydroxide-supplying additives (e.g., EPK clay, aluminosilicate and/or talc) can react with the excess acid in order to produce water, which facilitates in forming porosity and permeability in the concrete product. More specifically, the total water in the mix (including water generated as a result of the hydration reaction, water added directly to the mix, and water present in the aggregate) generally determine the porosity, and size of the pores, to provide interconnectedness of the pores, and thus permeability, to the end product. An additional benefit to using potassium-aluminum-silicate (i.e., Custer feldspar) as a hydroxide-supplying additive is that it removes excess water from the mix of materials (by reacting with the water to form carbonates and/or sulfates), leaving behind aluminum silicates. The Custer feldspar improves durability of the end concrete product, can act as a brightening agent, and allows for the use of less zinc-based metal cement agent. Other additives can also be used to react the excess acid, as described below. As indicated above, magnetite can be one such additive, which can also act as a setting agent (as described below). The use of magnetite as a setting agent results in the formation of hydrates in the concrete product. These hydrates (typically iron hydrates) can afterwards be removed from the cured concrete product by washing or heating, thus producing porosity and permeability in the concrete product. I will now provide an example of the excess acid variation, and will follow the example with a discussion specific to the example.

Example of excess-acid variation for producing porosity and permeability. In the following example (and indeed, as with all examples provided for herein) the quantities of the mix components are provided to produce a standardized cylindrical 2 inch (diameter) by 4 inch test specimen. These test specimens can be scaled up to commercial sized units by linear scaling of the quantities of mix components. In this example the mix components were as follows:

As metal-based cementing agent (dry): ZnO (30 g; <5% $ZnCO_3+Zn(OH)_2$);
As metal-cement reacting agent (liquid): $H_3PO_4$ (35 g of 85% solution);
As supplemental liquid: $H_2O$ (~20 g for a 10 inch slump);
As aggregate: pipe bedding quartzite sand/gravel (<6% moisture; ~ 50% passing 150 mesh, ~100% passing 50 mesh (200 g));
As reinforcing material: chopped glass fibers, 8 mm in length (4 g);
As first hydroxide-supplying additive (dry): EPK clay (10 g); and
As second hydroxide-supplying additive (dry): talc (magnesium silicate hydrate (10 g)).

The mix components were then mixed and processed as follows:
Mix reinforcing fibers and aggregate.
Mix metal-based cementing agent to aggregate/fiber mix.
Add and mix EPK clay and talc to the mixture.
Mix the liquid metal-cement reacting agent with the water;
Add the mixed liquids to the mixed dry components and mix all components together until desired level of workability of concrete mixture is achieved—additional liquid water can be added to achieve desired workability and slump.
Place mix components in a mold.
Place mold in drying oven and dry at 195 F until molded concrete unit retains shape. Then remove from mold.
Cure molded concrete unit in oven at 450 F-550 F for one hour per inch of thickness.

The test unit which was formed according to the above example achieved the following results: water flow of >10 inches water per hour (>25 in/hr with 50 g of water); and compressive strength of >8500 psi. (Water flow rates were determined using simulated increasing rainfall rates until water flowed across the top surface of the tested concrete block rather than through the block.) Further, notwithstanding the high water flow through the finished concrete product, the concrete product had a glazed-finish surface appearance due to the addition of the talc. (A similar result can be achieved by using K-feldspar instead of, or along with, talc—in both instances the glazed finish appearance is due to the presence of silica on the surface of the end product following curing.) Porosity for the concrete product was calculated to be 40%. During the curing process in the above example, carbon dioxide is released as a byproduct (the carbon being released from a metal carbonate—e.g., $ZnCO_3$, talc, and/or feldspar), resulting in porosity in the concrete product. Further, during the reaction the $OH^-$ groups released from the EPK clay and talc bind with $H^+$ released from the phosphoric acid (the acid-based cement reacting agent) to form water, which is released from the product during the drying and oven curing stage to form permeability connecting the porous spaces. The resulting concrete product thus not only can pass significant quantities of water (due to its high permeability), but can also be used to store large amounts of water (when sealed on the sides and bottom) due to its high porosity. Thus, the porous, permeable concrete product can be used as a water detention cell in the manner described below with respect to FIGS. 1-9. In the excess acid/hydroxide-supplying additive variation, heating the formed mixture of products above boiling (212 F at standard pressure) assures reaction of the excess acid with the talc/EPK (as well as the aggregate, and hydroxyl groups on the faces of the aggregate) so that the excess acid is reacted and thus consumed. It will be noted that in addition to reacting with the zinc in the metal-based cementing agent, the acid also reacts with the aluminum in the EPK clay, and/or the magnesium in the talc, to create additional cement bonds.

In the example just described, the mold was a rectangular shaped mold with sides formed from wood and a concrete bottom (formed using Portland cement). The concrete bottom of the mold was prepared by spraying vegetable oil over the area which would be in contact with the poured concrete, and then applying fine silica sand to the vegetable oil (to act as a release agent). This approach was found to be preferable to using a metal mold since the wooden and prepared concrete mold did not chemically react with acid in the poured concrete.

Modifications to excess acid method. In the example provided above, the hydroxide-supplying additive is provided as equal parts EPK clay and talc. However, each of these components can be added in amounts ranging from none to 100%. Also, as an alternative to the EPK clay and/or talc, the hydroxide components can be provided by adding hydrogen peroxide (liquid) to the mix components, or using a metal peroxide (e.g., zinc peroxide ($ZnO_2$)) instead of, or in addition to, the metal oxide used as the metal-based cementing agent. Also, alternative methods to consume the excess acid include the following: (a) add ethylene derivatives (such as ethylene glycol) to the mix components to produce tri-ethyl phosphate (which consumes surplus hydrogen and phosphorous); (b) add ethanol to the mix components to produce tri-ethyl phosphate; and (c) add brewer's yeast to the mix components and heat to 250-450 F, which will cause the yeast to react with the phosphorous and sublime off. In the case of alternative (b) (adding ethanol), the ethanol can also be produced as a byproduct within the reaction by adding yeast and sugar to the mix components, or yeast and ethylene glycol, which will produce ethanol. Further, an alternative formulation is as follows:

As metal-based cementing agent (dry): ZnO (30 g; <5% $ZnCO_3+Zn(OH)_2$);
As metal-cement reacting agent (liquid): $H_3PO_4$ (45 g of 85% solution);
As supplemental liquid: $H_2O$ (~20 g for a 10 inch slump);
As aggregate: pipe bedding quartzite sand/gravel (<6% moisture; ~50% passing 150 mesh, ~100% passing 50 mesh (200 g));
As reinforcing material: chopped glass fibers, 8 mm in length (4 g);
As first hydroxide-supplying additive (dry): EPK clay (50 g);
As second hydroxide-supplying additive (dry): talc (magnesium silicate hydrate (5 g)); and
As a carbon dioxide generator: Custer feldspar (5 g).

In addition to creating porosity and/or permeability in the end concrete product, it can also be desirable to produce concrete products having low (or nil) porosity or permeability. For example, lowering porosity will typically raise the compressive strength of the concrete product. Also, lowering permeability will reduce water intrusion into the concrete product, making the product more resistant to deterioration from freeze-thaw cycles. The method used to reduce porosity/permeability will depend in large part on the metal cement selected for use. In one example where the metal cement produces an anion as a by-product of the curing reaction, then porosity can be reduced by including a component which can scavenge the released ions and thus prevent them from being in a gaseous form. For example, if the anion is chlorine and the cement curing reaction results in the release of hydrochloric acid (gas), then by adding a metal oxide (or hydroxide), the chlorine is captured as a solid metal chloride. In another example, when the cement reacting agent is phosphoric acid, then a useful acid scavenger is potassium-feldspar (also known as K-feldspar, and Custer). In this instance the K-feldspar scavenges the phosphate ions, preventing them from becoming acidic. More specifically, the excess phosphoric acid will react with the K-feldspar, decomposing to silica and potassium-aluminum-phosphate (a metal hydrate). This is an exothermic reaction, which aids in driving the cementing reaction to completion and also raises the pH to near 7 (neutral). Thus, the K-feldspar drives the cementing reaction to completion by acid scavenging as well as heating.

Additional acid scavengers that can be used in the methods of fabricating the metal-cement based concretes provided for herein include sodium feldspar, sodium silicate and potassium silicate. The indicated silicates can act not only as acid scavenging agents, but also as a metal-based cementing agent (more specifically, an alkali metal cementing agent). Further, when the formulation includes a hydroxide supplying agent (such as EPK clay, as described above), then the indicated silicates will form alkali aluminum silicates, which have the effect of accelerating the curing reaction of the cement in the concrete product. Further, metal-based cementing agents (such as zinc sulfate) can be replaced in the mixture in whole, or in part, by alkali metal cementing agents such as potassium sulfate or sodium sulfate. In this instance, when the mixture includes a hydroxide supplying agent (such as EPK clay) the alkali metal cementing agents will produce alkali aluminum silicate cement, and the sulfate ion will react with the setting agent (e.g., magnetite) to form an insoluble cement iron sulfate. When the metal-based cement agent is entirely an alkali metal cementing agent, the resulting cement will be an alkali aluminum silicate cement (versus for example, a metal phosphate cement). The alkali aluminum silicate cement behaves more like a ceramic than a metal cement, and can thus be used in applications where wear is a potential issue.

Accelerants and setting agents. In order to shorten curing time for the metal-cement based concrete products provided for herein, accelerants can be added to the mixture of materials. Beyond the advantage of allowing the concrete products to be placed in service sooner, the use of accelerants also has the advantage of allowing cast-in-place concrete to be formed at lower ambient temperatures (versus not using an accelerant). Further, as discussed above, concrete products having porosity and permeability can be formed using the methods provided for herein, however the use of an accelerant can tend to prevent the release of gasses (such as $CO_2$ and water) which can form such features, and thus results in a concrete product having higher density, and consequently greater strength. In addition to accelerants, a setting agent can also be added to the mixture of components for the metal-cement based concrete. A setting agent allows the mixture of the metal-based cementing agent, the acid-based cement reacting agent, and the aggregate to form a solid concrete product which can then further cure to achieve its ultimate strength. That is, the setting agent allows the mixture of components to cure to a certain degree of hardness such that the concrete product can be handled, or temporarily used, until the desired end-strength of the concrete product is achieved. For example, a setting agent allows a unit-cast concrete product to be removed from a mold (or taken from an extrusion unit) prior to achieving its ultimate strength so that the unit-cast (or extruded) concrete product can be moved to a more convenient location for ultimate curing, thus freeing up the molds and/or extrusion units to form more concrete products. Likewise, for cast-in-place concrete products a setting agent allows the formed concrete product (such as a roadbed) to be used in limited duty to facilitate further construction of the final concrete structure. One example of an accelerant which can be used in the formation of the concrete products is methylated acid—i.e., the acid-based cement reacting agent used to react with the metal-based cementing agent can be provided in the form of a methylated acid, such as methyl phosphate ($CH_3PO_4$) or trimethyl phosphate (($CH_3$)$_3PO_4$). An example of an accelerant can thus be a metal formate or metal acetate, such as the magnesium based $3Mg(OAc)$, where "OAc" is a generic descriptor for the acetic acid or, in this case, an acetic acid compound. When the acid-based cement reacting agent includes phosphoric acid ($H_3PO_4$), then methyl phosphate is produced, which can act as the accelerant, freeing up the magnesium to react and form $Mg_3(PO_4)_2$ (a metal cement bond), and releasing gaseous acetic acid ($CH_3OAc$) as a byproduct. Further, if in this example the metal cement agent is a zinc formate or zinc acetate (generically, $Zn^{+2}(OAc)_2$), then an intermediate product of ethyl phosphate is formed, the zinc is freed to react with this intermediate product, and a final metal cement of zinc phosphate ($Zn_3(PO_4)_2$)) is formed, with a gaseous by product of acetic acid. In this example the phosphoric acid bonds with metal "M" elements in the aggregate, as well as with the metals in the metal-cement component, as well as with the metal in the setting agent.

Additional examples of accelerants that can be used in forming concrete products according to the present disclosure include ammonium phosphates—specifically, diammonium phosphate $(NH_4)_2HPO_4$, monoammonium salt $(NH_4)H_2PO_4$, and triammonium phosphate. In addition to acting as an accelerant, formulations of methyl phosphates and ammonium phosphates can act as the cement reacting agent. Specifically, mono- and di-methyl phosphates have extra oxygen over trimethyl phosphate, and thus can act as a metal-cement reacting agent. Likewise, mono- and di-ammonium phosphates have extra protons (i.e., acidic) over triammonium phosphate, and thus can act as a metal-cement reacting agent.

Hydrate-forming setting agents. A principal effect of the reaction of the metal cement acid-based reacting agent with the metal cement agent and the aggregate is the release of liquid water. In order to speed the setting of the concrete product it is beneficial to remove this water, either by physically extracting it from the concrete (e.g., by evaporation) or by chemically binding it with other elements within the concrete—i.e., performing a dehydration process. I have found that metal oxides can be used to form metal hydrates within the concrete products provided for herein, thus fixing the excess water in the concrete and allowing faster setting times for the concrete. The metal-based setting agent is preferably a metal oxide which, when it bonds with the anion produced by the cement reacting agent (e.g., anions such as phosphates, sulfates, borates, etc.) will chemically produce a hydrate, and preferably a higher order hydrate (e.g., 2+ or higher). More specifically, the metal cement reacting agent will produce, depending on the agent used, a phosphate, sulfate or borate, which can combine with the metal in the metal-based setting agent, along with water in the concrete, to form a metal hydrate, which can also act as an insoluble cement. Typical metals in the metal-based setting agent are iron, manganese and magnesium. I have found that iron has a particularly beneficial effect in this regard, and more specifically, magnetite ($Fe_3O_4$) and/or iron peroxide ($FeO_2$). For example, when magnetite is used as the metal-based setting agent, and the cement reacting agent is phosphoric acid, then the surplus water forms with the setting agent and the phosphates to produce iron phosphate hydrate. The amount of the metal-based setting agent to be added to the concrete mix is from about 0.5% to about 5% of the total dry weight of the mix components. Preferably the metal-based setting agent is provided as a fine powder (about 10 micron of less), and is added to the concrete mix components in a dry form, and prior to the addition of any liquid component. Also, when the concrete is to be cast-in-place (i.e., prepared at a plant and transported to a remote site for casting), then it can be desirable to add the metal-based setting agent at the location where the casting is to take place. In this instance the metal-based setting agent can be provided as a liquid emulsion by mixing the powdered form of the cementing agent with a liquid such as water, ethylene glycol, and/or alcohol. An additional benefit to adding the metal-based setting agent to the concrete is that it allows the metal in the metal cement agent to react more readily with the cement reacting agent. It is known that metal hydrates can act as fire insulation (since they hold a large quantity of water, and thus have very high heat capacities), and so a metal-cement based concrete formed using a metal-based setting agent will inherently have high resistance to fire (i.e., will retain strength, and will resist heat transfer).

As indicated above in the discussion on forming porous and permeable metal-cement based concrete products, the use of a metal-based setting agent can aid in this regard. Specifically, the hydrates formed by the use of the metal-based setting agent have typical sublimation and/or melting points of around 400 F (or even as low as 250 F). Accordingly, when the concrete product can be placed in an oven at this hydrate melting/sublimation temperature, the hydrates will tend to be driven off from the concrete product (more particularly, the water is released from the hydrates), leaving behind voids (porosity) and channels (permeability) in the concrete product. Alternately, the hydrates can be removed from the concrete product by water washing (wherein heated water under pressure tends to be more effective at removing the hydrates). It will be noted that the hydrates can be left in the concrete product with no ill effect, and removed at a later time if so desired. And, as indicated earlier, the hydrates can, when left in the concrete product, have a beneficial fireproofing effect, as the heat of a structure fire can dehydrate the concrete (and creating porosity in the concrete).

When a metal-based setting agent is used in the formulation of the metal-cement based concretes, and particularly when the metal in the setting agent is iron, then the resulting concrete product will typically be dark grey to black. In some instances, for aesthetic purposes, it is desirable that the concrete product be a lighter color than black, and even that it be a near-white color so that is can later be stained to desired color. I have found that the addition of titanium dioxide ($TiO_2$), along with the use of the iron metal setting agent, can produce lighter colored concrete product—even near white, depending on the amount of titanium dioxide used. That is, the titanium dioxide acts as a brightening agent. However, the addition of titanium dioxide tends to reduce the effectiveness of the iron-based setting agent. The amount of the brightening agent to be added to the concrete mix is from about 0.5% to about 2.5% of the total dry weight of the mix components. The ratio of the combined amounts of metal setting agent and brightening agent can be 25/75-75/25 (setting agent/brightening agent).

Following is an example of a formulation for a metal-cement based concrete product that includes a metal-based setting agent.

As metal-based cementing agent (dry): ZnO (30 g; <5% $ZnCO_3$+$Zn(OH)_2$);
As metal-cement reacting agent (liquid): $H_3PO_4$ (35 g of 85% solution);
As supplemental liquid: $H_2O$ (~20 g);
As aggregate: pipe bedding quartzite sand/gravel (<6% moisture; ~50% passing 150 mesh, ~100% passing 50 mesh (200 g));
As reinforcing material: chopped glass fibers, 8 mm in length (4 g);
As hydroxide-supplying additive (dry): EPK clay (15 g); and
As metal cement setting agent magnetite powder ($Fe_3O_4$), 10 micron or less mean diameter (10 g)).

In this example the resulting concrete product set (hardened) sufficiently after 30 minutes to allow handling of the cast unit. The unit was then placed in an oven at 450 F for 3 hours. The resulting cooled unit had a compressive strength of greater than 8500 psi, passed water at the rate of greater than 8 inches per hour. Porosity for the concrete product was calculated to be 20%.

Thus far I have chiefly described the use of setting agents with respect to oven-cured concrete product. However, I have also developed a formulation using a setting agent that can be used for cast-in-place concrete products. In this formulation the metal-based cementing agent is zinc sulfate ($ZnSO_4$). An exemplary formulation is thus as follows:

As metal-based cementing agent (dry): $ZnSO_4$ (15 g);
As metal-cement reacting agent (liquid): $H_3PO_4$ (25 g of 85% solution);
As supplemental liquid: $H_2O$ (~25 g);
As aggregate: pipe bedding quartzite sand/gravel (<6% moisture; ~50% passing 150 mesh, ~100% passing 50 mesh (200 g));
As reinforcing material: chopped glass fibers, 8 mm in length (4 g);
As hydroxide-supplying additive (dry): EPK clay (25 g);
As an acid scavenging agent: K-feldspar (Custer) powder (15 g); and
As metal cement setting agent magnetite powder ($Fe_3O_4$), 10 micron or less mean diameter (10 g)).

In this example not only the magnetite dehydrates the reaction (as described above), but the sulfate ($SO_4$) from the metal-based cementing agent forms metal sulfate hydrates (e.g., with $Fe^{+3}$) to further remove water (as hydrates) as a reaction product. Further, the sulfate reacts with the iron from the magnetite to form an iron sulfate hydrate, thus removing the sulfate from the reaction components and allowing the cement to cure. The K-feldspar scavenging agent scavenges excess phosphoric acid and forms potassium aluminum phosphate and potassium aluminum silicate. It will be noted that since the concrete product is cast-in-place the formed hydrates cannot be removed from the concrete by the use of an oven, and thus permeability of the concrete product will be reduced. However, certain of the hydrates can be chemically removed (if desired) by the use of appropriate solvents (e.g., hot water pressure washing). Further, the cast-in-place concrete product can be surface cured by passing a mobile heater (such as a propane heater) over the surface to temporarily raise the surface temperature to about 350 F, thus driving off hydrates. Also, when the concrete product is cast as, or assembled as, a hollow unit, hydrates can be driven off by placing a heater inside the hollow unit.

Plasticizers. I have observed that when using setting agents in the manufacture of the metal-cement based concrete (as described above), small surface cracks can be found on the cured and kilned (heated) concrete products. While not affecting performance of the concrete product (i.e., permeability and compressive strength are not appreciably affected), these surface cracks can be undesirable from an aesthetic standpoint. One method to reduce the formation of such surface cracks is to place the concrete products into an oven under conditions that reduce any drawdown of the oven temperature while the concrete product is being placed into the oven. One way to do this is to provide a heat sink in the oven which can help to return the oven to the desired temperature once the oven is sealed. In this way the outer surfaces of the concrete product have less time to dry out at temperatures below the desired curing (kilning) temperature. Further, the use of more of the metal-cement in the mix of materials can help to resist tension forces which result from the removal of the hydrates (and which thus cause surface cracking). Another method to reduce the formation of surface cracks is to provide the concrete product with a plasticizer either as part of the formulation, or as a surface treatment. The plasticizers can aid in lowering bubble formation on the surface of the concrete product, which in turn can lead to the cracking phenomenon mentioned above. One example of a plasticizer that can be used is tri-ethyl phosphate, which can be produced by adding ethylene glycol and phosphoric acid ($H_3PO_4$). In this instance it is desirable that the ethylene glycol and phosphoric acid be added in a stochiometric ratio such that there is no (or very little) surplus ethylene glycol in the mix components (which could deprive the concrete mix of the phosphoric acid needed to form the metal cement). The ethylene glycol can be added in the amount of 1-2.5% of the total mix components. When the cement reacting agent is sulfuric acid, then a plasticizer that can be used is hydrogen peroxide. In addition to acting as a plasticizer, the hydrogen peroxide acts as a curing retardant (by making the hydrates more acidic), removes water from the curing product, entrains additional air in the curing product, and reduces the size of bubbles that form during the curing process (making for increased permeability and porosity, while preserving strength of the end product). The amount of hydrogen peroxide to be used is less than 0.5%, and preferably between 0.10 and 0.25%. The hydrogen peroxide works particularly well when zinc sulfate is used as the metal-based cementing agent, but does not cure quickly in cast-in-place applications, making it more useful for cast products that can be placed in an oven for curing. For cast-in-place applications, surface cracking can be reduced by heating the surface of the concrete with a heater (e.g., a propane heater) to a temperature of about 350 F.

Following is an example of a cast-in-place formulation using plasticizers.

As metal-based cementing agent (dry): $ZnSO_4$ (20 g);
As metal-cement reacting agent (liquid): $H_3PO_4$ (28 g of 85% solution);
As supplemental liquid: $H_2O$ (~20 g);
As aggregate: pipe bedding quartzite sand/gravel (<6% moisture; ~50% passing 150 mesh, ~100% passing 50 mesh (200 g));
As brightening agent: titanium dioxide (3 g);
As a first hydroxide-supplying additive (dry): EPK clay (20 g);
As a second hydroxide-supplying additive and acid scavenging agent (dry): K-feldspar (Custer) (15 g);
As a plasticizer: hydrogen peroxide ($H_2O_2$) (0.22 g); and
As metal cement setting agent magnetite powder ($Fe_3O_4$), 10 micron or less mean diameter (12 g)), Reinforcing materials. The metal-cement based concrete products produced by the methods provided for herein can be supplemented with enhanced strength and/or durability attributes by the addition of reinforcing materials. In the formation of concrete products using Portland cement, the traditional method for reinforcing the concrete product is by the use of steel bar material (commonly known as "rebar"). It is also known to use fibers (such as steel, glass and plastic) in order to reinforce concrete. All of these known means for reinforcing Portland-cement based concrete are equally applicable to the metal-cement based concrete products provided for herein, although the specific mechanisms for providing increased strength and durability to the final concrete product can vary. In the case where iron-based reinforcing bar material is used, the bar material can first be coated with a material which will bond with the metal-based cement such that iron in the iron-based reinforcing bar material will not be made available for future chemical reactions. One example of a coating which can be applied to iron-based rebar material is a polymeric coating such as nylon. However, when the cement reacting agent is phosphoric acid, then the iron reinforcing bar material will react with the phosphoric acid, generating an iron phosphate ($FePO_4$) protecting coating. It is noteworthy that glass fiber reinforcement (including spun basalt fiber) is oftentimes not used in Portland cement concrete products due to the alkaline nature of Portland cement, which can cause degradation of the fibers. This, however, is not a concern when glass reinforcing fibers (including spun basalt) are used in metal-cement based concrete products.

Exemplary formulations of metal-cement based concrete products. Following are exemplary formulations for three types of metal-cement based concrete products which can be manufactured according to the above description. The first exemplary formulation is for a cast-in-place concrete product; the second exemplary formulation is for a plant-cast concrete product (i.e., the product is cast in a controlled environment in a plant setting, versus the ambient conditions of the cast-in-place first example); and the third exemplary formulation is for a clay-brick type of concrete made using metal cements. For each exemplary formulation I will provide exemplary material types and ranges, as well as conditions under which the concrete product can be formed.

First exemplary formulation: cast-in-place metal-cement based concrete product. In the first exemplary formulation, the metal-cement based concrete product is formed as a cast-in-place unit. Examples of such cast-in-place concrete products can include road surfaces, foundations, and other concrete products which are more easily formed in-place versus being formed at a remote location, and then transported to the desired final location of the concrete product. The desired properties for this exemplary formulation are that the resulting concrete product exhibit: (i) high compressive strength; (ii) resistance to cyclical freeze-thaw thermal expansion; and (iii) low permeability to transmission of fluids through the concrete product. For this example, the mix components include:

As the aggregate, fine aggregate (e.g., pipe bedding grade), being 60-90% of the total weight of the mix components, with the aggregate including a water content of around 6% (+/−3%) by weight of the aggregate.
As the metal cement agent, zinc acetate and/or zinc formate, being 2-15% of the total weight of the mix components.
As a first metal cement reacting agent, methyl-hydrogenphosphate solution in the amount of 2-15% of the total weight of the mix components, but preferably selected to achieve stoichiometric balance with the acetate and/or formate form of the metal cement agent.
As a second metal cement reacting agent, aqueous phosphoric acid ($H_3PO_4$), totaling ⅓ to ⅔ of the total weight of the cement reacting agent.
As an accelerant, magnesium acetate and/or magnesium formate, in the amount of 0.25% to 1% of the total weight of the mix components.
Mix water in the amount of ⅔ of the weight of the metal cement reacting agent. (The amount of water added can be decreased from the indicated amount based on (i) the moisture content of the aggregate, and (ii) whether the metal-based cement agent is dissolved in water.)

In mixing the components, the aggregate can be previously mixed with the metal cement agent, and provided at the site of use, at which time the metal cement reacting agent, and the accelerant, can be added, the overall components then mixed together and cast in-place to form a concrete product. The conditions under which such a cast-in-place metal-cement based concrete product can be formed according to the above description include ambient temperatures of at least 20 F.

Second exemplary formulation: plant-cast metal-cement based concrete product. In the secondary exemplary formulation, the metal-cement based concrete product is manufactured in a plant environment—i.e., a controlled environment, as opposed to the uncontrolled ambient environment under which the cast-in-place metal-concrete product is formed. The desired properties for this exemplary formulation are that the resulting concrete product exhibit: (i) high compressive strength; (ii) high porosity; and (iii) high permeability. (An exemplary use of this concrete product is as the water detention cells 206, described below with respect to FIGS. 2-5.) For this example, the mix components include:

- As the aggregate, fine aggregate, being 60-90% of the total weight of the mix components, with the aggregate including a water content of around 6% (+/−3%) by weight of the aggregate.
- As the metal cement agent, zinc acetate and/or zinc formate, being 2-15% of the total weight of the mix components. This component can be provided in a dry form.
- As the metal cement reacting agent, 2-15% by weight of ethyl-hydrogen-phosphate and/or methyl-hydrogen-phosphate.

Heat and/or vacuum can be added to the controlled curing process in order to force desirable attributes into the final concrete product.

Third exemplary formulation: plant-cast metal-cement based clay brick product. In the third exemplary formulation the objective is to form a brick using clay as the aggregate and metal-cement as the binder. In this example the mix components can include:

- As the aggregate, 25-90% of a fine clay material, with the aggregate including a water content of around 8% (+/−2%) by weight of the aggregate. The clay aggregate can be new clay, recycled clay, and combinations thereof.
- As the metal cement agent, zinc sulfate, zinc acetate and/or zinc formate, being 2-15% of the total weight of the mix components.
- As the metal cement reacting agent, 2-15% by weight of ethyl-hydrogen-phosphate and/or methyl-hydrogen-phosphate.
- Heat and/or vacuum can be added to the controlled curing process in order to force desirable attributes into the final concrete product.

When the wet concrete uses clay as an aggregate, then the wet concrete can be extruded to manufacture units such as bricks. In this instance it can be helpful to provide a retardant to the wet concrete mixture to allow sufficient time to move the extruded units from the extruder to a drying rack. Further, when using clay as an aggregate to manufacture bricks and the like, the preferred method of mixing the components is using a dry powdered cement reacting agent such as diphosphorus pentoxide. The extruded units can be dried at a low temperature (about 200 F or below). After drying, the brick units can be placed in an oven at a selected temperature to allow unreacted portions of the dry acid component to sublime and form pores in the brick units. For example, when the dry acid component is diphosphorus pentoxide, the dried brick units can be kilned (heated) at a temperature of 644 F or below. At this temperature the diphosphorus pentoxide will sublime, but not the metal, and the vapor from the diphosphorus pentoxide will form voids in the brick units. Porosity can also be produced in the brick units when they are manufactured by adding wet acid and water to the dry metal-based cementing agent/aggregate mixture. In this example excess wet acid (e.g., $H_3PO_4$) is added to the mixture.

In a further exemplary formulation, the metal-based cementing agent is at least 85% anhydrous zinc acetate, the cement reacting agent is at least 70% ammonium phosphate and at least 20% phosphoric acid, and the accelerant is at least 85% anhydrous magnesium. In this example the ratio of the non-aggregate cementing agent components (excluding water) to the aggregate is 1:7. Further, the aggregate can be any of the types of aggregate provided for herein, such as sand, and preferably is sized such that at least 80% of the aggregate passes a 150 micron screen. To assist in workability of the concrete components, and aid in wetting the aggregate surfaces, water can be added in a ratio of 1.5 parts water to 1 part metal-cement components.

Examples. I will now provide two specific examples of formed concrete products which were manufactured using metal-based cements according to the above disclosure. In both examples a cylinder of 2 inches in diameter by 4 inches in length was cast using the indicated components. Both examples included curing the cast units at an ambient temperature of 60 degrees F., and at standard atmospheric pressure. Weights are given in grams (g).

Example I: In a first example, a metal-cement based concrete product is formed using the following materials, and according to the indicated process:

- Aggregate: granitic mine tailings, 200 g—80% passing 250 micron screen.
- Metal-based cementing agent: zinc acetate (anhydrous), 25 g.
- Acid-based cement reacting agents: (i) phosphoric acid (anhydrous), 5 g; and (ii) ammonium-hydrogen-phosphate, 15 g.
- Accelerant: magnesium acetate (anhydrous), 5 g.
- Supplemental liquid: water, 25 g.
- Reinforcing material: glass fibers, 0.375 inch long, 3.5 g.

In this first example the metal-based cementing agent was first mixed with the aggregate and the water and the reinforcing fibers. Thereafter the two acid-based cement reacting agents and the accelerant were added and mixed with the other components. The resulting concrete mixture was then left to cure for a period of 4 hours, after which it reached a compressive strength estimated at >18,000 psi. It will be observed in this first example that the ammonium phosphate used as a cement reacting agent could also be considered as an accelerant.

Example II: In a second example, a metal-cement based concrete product is formed using the following materials, and according to the indicated process:

- Aggregate: kaolinite clay, 200 g—80% passing 250 micron screen.
- Metal-based cementing agent: zinc acetate (anhydrous), 25 g.
- Acid-based cement reacting agents: (i) phosphoric acid (anhydrous), 5 g; and (ii) ammonium phosphate, 15 g.
- Accelerant: magnesium acetate (anhydrous), 5 g.
- Supplemental liquid: water, 75 g.
- Reinforcing material: glass fibers, 0.375 inch long, 3.5 g.

In this second example the metal-based cementing agent was first mixed with the aggregate and the water and the reinforcing fibers. Thereafter the two acid-based cement reacting agents and the accelerant were added and mixed with the other components. The resulting concrete mixture was then left to cure for a period of 4 hours, after which it reached an estimated compressive strength of >8500 psi.

It will be appreciated that the exemplary formulations for metal-cement based concrete products provided above are exemplary only, and should not be considered as limiting the scope of formulations which can be provided according to the present disclosure.

Exemplary Uses of Porous/Permeable Metal-Based Cement Concrete Products.

As described above, the metal-cement based concrete products provided for herein can be engineered to have selected properties of porosity and permeability. Typically such concrete products will be formed as cast units, versus being cast-in-place, but this is not a requirement. However, for the sake of the following discussion it will be assumed that the porous and permeable concrete products are cast units. Accordingly, when the term "cast unit" is used in the following discussion, it will be assumed to be a cast metal-cement based concrete product having porosity and permeability. While cast metal-cement based concrete products having high porosity and low permeability are useful for producing structures that are low weight, high strength and water impermeable, the following examples will be directed towards cast metal-cement based concrete products that are also permeable, to allow fluids (typically water) to flow through the cast unit. The combination of high porosity and permeability not only allows water to pass through the unit, but also provides temporary water storage capacity. In this way the porous, permeable cast units can facilitate in the control of runoff water, as will be described in more detail below.

Road Beds. Turning to FIG. 1, a road construction system 100 is depicted in cross section across the width of a road surface 102. The road surface (or road covering) 102 can be provided as any known type of road surfacing material, such as asphalt or Portland cement concrete. The road surface 102 is positioned relative to surrounding terrain "T". The road surface covering 102 is further supported on a series of pre-cast porous, permeable metal-cement based concrete blocks 104. The concrete blocks 104 are in turn supported on a bed of grout 106, which allows the concrete blocks 104 to be leveled (or graded) as desired. Preferably, during construction the grout 106 is applied to the terrain "T", and the concrete blocks 104 are then positioned on top of the grout before the grout sets to a solid form. Leveling of the concrete blocks 104 on the uncured grout 106 can be performed by means such as using a compactor. Preferably, once cured the grout 106 is essentially water-impermeable. While not depicted in FIG. 1, the concrete blocks 104 can be joined together by dowels or the like to resist differential settling from block to block.

The road system 100 differs from prior art road systems, which generally place the road surface covering on a bed of compacted crushed rock, gravel and sand. Over time, water can flow through and under the road bed, causing it to settle with respect to the local terrain. With the road system 100 of FIG. 1, water is directed away from the sub-surface terrain which supports the concrete blocks 104, and in turn the road surface covering 102, thus reducing the likelihood of future roadbed settling. Water-flow arrows have been added to FIG. 1 to demonstrate how water can flow into, and out from, the concrete blocks 104, and into the surrounding terrain "T". It will be appreciated that the configuration depicted in FIG. 1 and described above can be used for other applications where it is desirable to remove subgrade water which can degrade the load bearing characteristics of support structures. For example, the water permeable concrete blocks 104 can be used as railroad sub-bedding to replace (or augment) traditional ballast, or beneath building foundations. It will also be appreciated that the permeable concrete blocks 104 can be augmented with traditional pile supports where anticipated loads may approach or exceed the compressive strength of the concrete blocks. Further, once in place, the concrete blocks 104 can be post-tensioned to reduce stress on the concrete when in use.

Exemplary dimensions for one of the concrete blocks 104 of FIG. 1 is 4 feet wide, 4 feet deep, and 2 feet thick. This allows for ease of handling when putting the blocks 104 in place on top of the grout 106. It will be appreciated that FIG. 1 is not necessarily to scale, since for the eight blocks 104 depicted, and at an exemplary block width of 2 feet, this only provides for a road width of about 16 feet (basically, a two lane road).

Storm water runoff control. The porous, permeable metal-cement based cast concrete products provided for herein can be used alongside roads and water-permeable sidewalks, and proximate other areas where the management of storm water runoff is desired. Specifically, the porous and permeable blocks can be used as temporary storm water detention cells to hold storm runoff until the water can be released into the ground or into a sump. The primary advantage of using storm water detention cells (versus merely collecting the water into a sump or holding tank) is that the runoff detention cells allow for collected storm water to be filtered as it passes through the detention cell, thus facilitating in the removal of solids and surface chemicals (such as oil and ice melters). When the detention cells are used with accompanying sumps (as described below), this filtering feature helps to keep solids out of the sumps, and thus reduces the need to clean the sumps to remove accumulated solids. As for removing oil from the storm runoff water, oil will tend to adhere to the formed concrete surrounding porous openings in the concrete detention cell. At some point the detention cells can become plugged with filtered solids and oil and the like, at which time the detention cells can be easily replaced. The detention cells thus provide a component of a storm water management system that lets storm water be returned to the ground (and potentially an aquifer) without the need to treat the storm water beforehand. A further advantage of using the detention cells in a storm water management system is that the cells fill the void space in what otherwise would be an empty (or partially filled) tank. By filling the void space in a water collection tank (with the detention cells) debris and vermin (such as rats) are prevented from moving into the tank. As described below, placement of the detention cells adjacent to streets, parking lots and residential homes can facilitate the collection and dissipation of storm water runoff.

Figure 2:
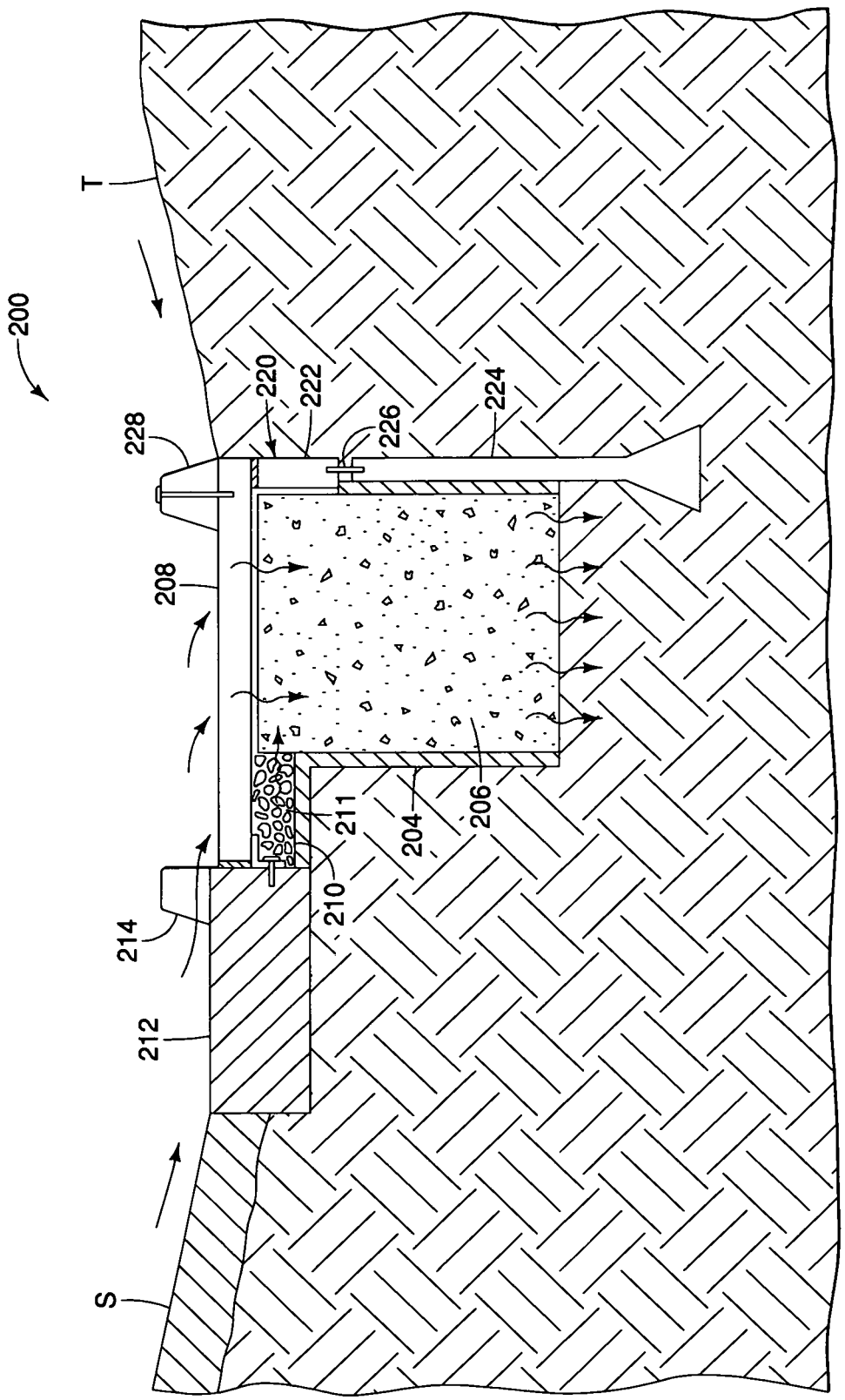
FIG. 2 is a sectional view of a storm water runoff collection system that includes a porous, permeable cement water retention cell fabricated according to the methods provided for herein.
Figure 3:
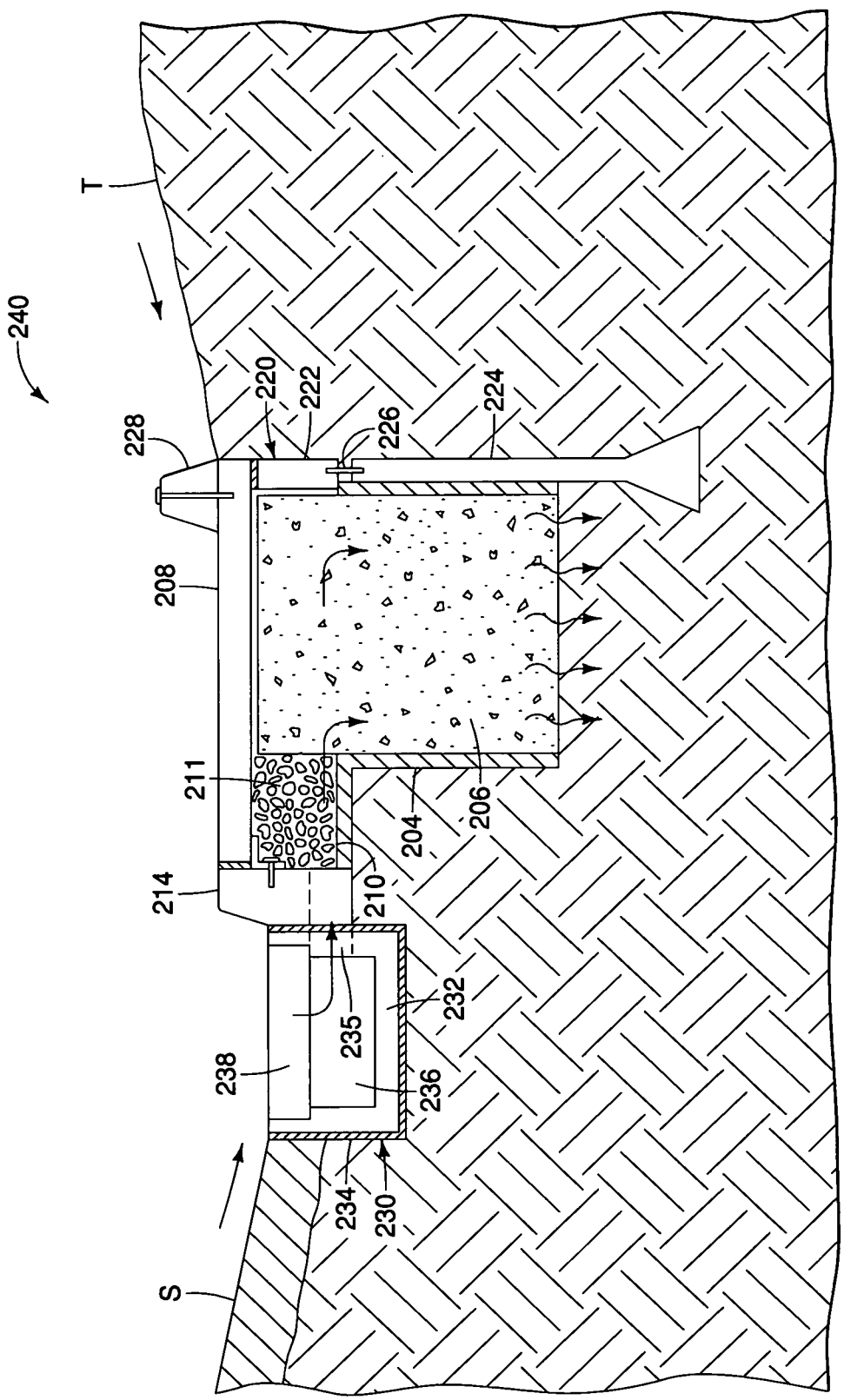
FIG. 3 is a sectional view of a variation of the storm water runoff collection system of FIG. 2.
Figure 4:
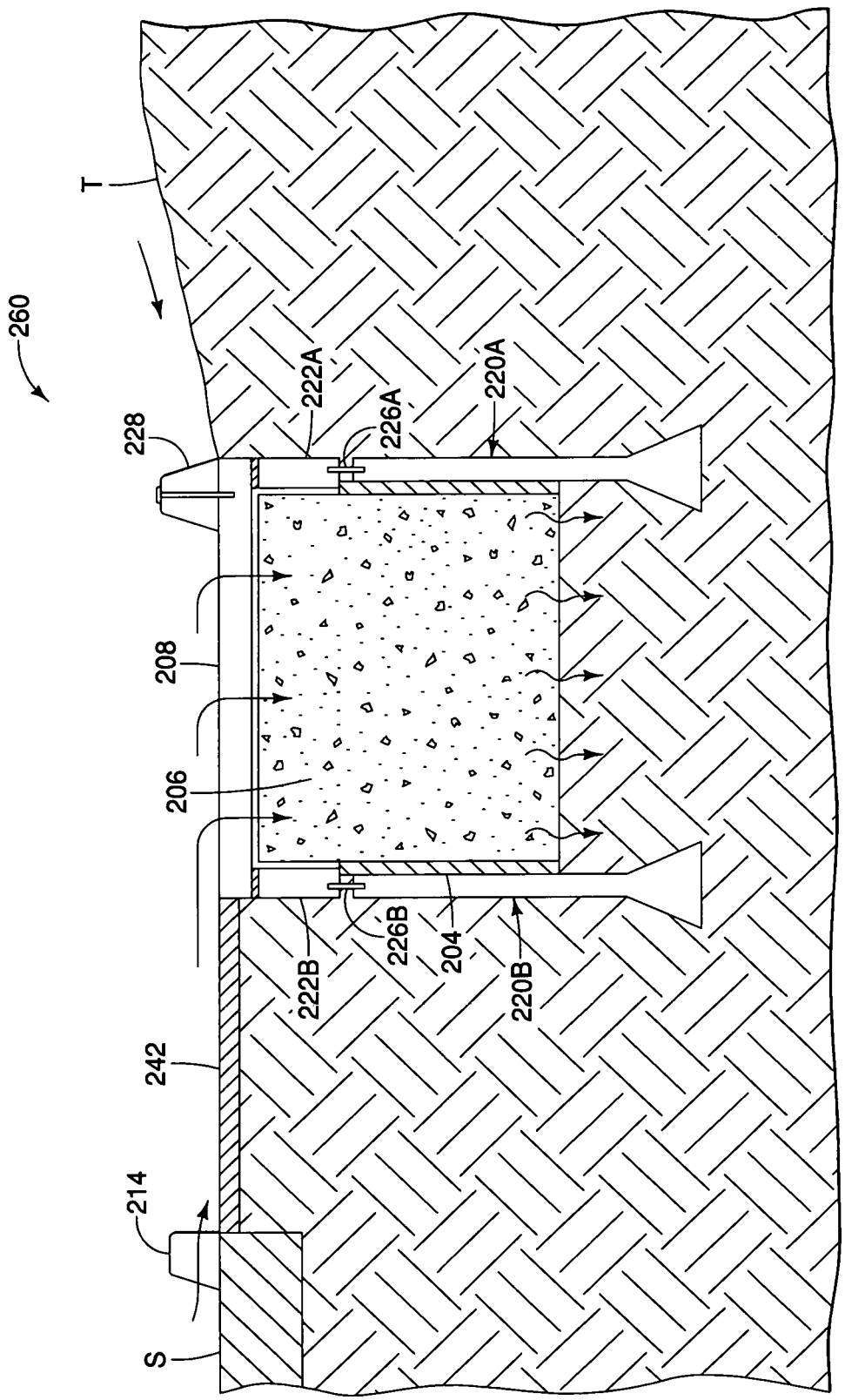
FIG. 4 is a sectional view of another variation of the storm water runoff collection system of FIG. 2.

FIGS. 2 through 5 are sectional views of storm water runoff collection systems that include a porous, permeable concrete water detention cell fabricated according to the methods provided for herein. All of these storm water collection systems can be installed either accompanying new road or street installation, or as an upgrade to existing streets and roads. The storm water collection systems 200, 240, 260 and 270 of respective FIGS. 2, 3, 4 and 5 include certain common features, which will now be described. Thereafter I will describe the unique features of each different water collection system. The storm water collection systems of FIGS. 2-5 are all indicated as being located adjacent to a street "S" having a curb (214) on a first side (depicted on the left side in the figures), and adjacent to terrain "T" (such as turf or dirt) on a second side (depicted on the right side of the figures). The curb 214 can be part of a concrete apron or gutter at the side of the street "S". It will be appreciated that the terrain "T" can also include a hard surface (not shown) such as a paved driveway, parking lot, or other hard surface from which storm water can run off. In FIGS. 2, 3 and 4 the respective water collection systems 200, 240 and 260 each include a sidewalk (208) which is positioned between the curb 214 and the terrain "T", whereas the system 270 of FIG. 5 does not include a sidewalk. The sidewalk 208 in FIGS.

2-4 is preferably formed of a water permeable material, such as described in U.S. Pat. No. 9,943,791, or as described herein above. With respect to FIGS. 2, 3 and 4 the respective storm water runoff systems 200, 240 and 260 all include a porous, permeable concrete water detention cell 206 which is positioned beneath the sidewalk 208. The storm water runoff system 270 of FIG. 5 also includes a porous, permeable concrete water detention cell 206, but in FIG. 5 the water detention cell 206 has the upper surface thereof located at grade (i.e., exposed directly at grade level, and not positioned beneath any other feature). In each of FIGS. 2, 4 and 5 the curb 214 is provided with periodic openings (not numbered) to allow water to run off of the street "S" and into the porous, permeable concrete water detention cell 206, as indicated by the water flow arrows. In each of FIGS. 2-5 the porous, permeable concrete water detention cell 206 is sealed on the sides by grout 204 to force any discharge of water out through the bottom of the water detention cell. Also, each system depicted in FIGS. 2-5 includes a shoulder (or secondary curb) 228 located adjacent the terrain "T" and proximate the upper right side of each porous, permeable concrete water detention cell 206. The shoulder 228 allows excess water to pool over the porous, permeable concrete water detention cells 206, thus preventing this water from flowing into the terrain "T" without first passing through the detention cell. It will be appreciated that in cases of high water runoff from the street "S" the shoulder 228 can be breached by excess water, and thus may not prevent runoff water from entering the terrain "T" directly in all situations.

A further feature common to the water runoff collection systems 200, 240 and 260 (FIGS. 2, 3 and 4) is a settlement adjustment feature (220 in FIGS. 2 and 3, 220A and 220B in FIG. 4). The settlement adjustment feature 220 of FIGS. 2 and 3 is located adjacent the second (right) side of the porous, permeable concrete water detention cell 206, proximate the terrain "T". In FIG. 4, the system 260 includes two such settlement adjustment features (220A and 220B), located at the respective second (right) and first (left) sides of the water detention cell 206. Each settlement adjustment feature 220 (as well as 220A and 220B of FIG. 4) includes: a lintel beam 222 (222A, 222B, FIG. 4) which is attached to (or supports) the underside of the sidewalk 208; a pile (or pier) 224 (224A, 224B, FIG. 4) which is securely fixed in the ground; and an elevation adjustment device 226 (226A, 226B). The elevation adjustment device 226 can be used to elevate (or level) the sidewalk 208, as well as the water detention cell 206 when it is coupled to the lintel beam 222, in the event of settlement. An example of an elevation adjustment device 226 (226A, 226B) which can be used is a turnbuckle-type device that acts on oppositely threaded rods set in the lintel beam 222 and the pier 224.

Turning now specifically to FIG. 2, the runoff water collection and retention system 200 includes a water-impermeable apron 212 between the street "S" and the curb 214, and which incorporates the curb. The sidewalk 208 extends over a water collection channel 210, which can be filled with sand or gravel (211). Thus, during modest water runoff events, water runoff from the street "S" flows through the periodic openings in the curb 214, and is primarily directed into the water collection channel 210, where the sand/gravel fill 211 can remove large particles before the water moves into the porous, permeable water detention cell 206. Runoff water enters the upper portion of the detention cell 206, and flows downward, exiting the lower (bottom) end of the detention cell, and is then discharged into the lower portion of the terrain "T" (unless it enters a sump, as described below with respect to FIGS. 6a and 6b). In this way runoff water from the street "S" is filtered by the water detention cell 206 before being inserted into the ground. When runoff water exceeds the capacity of the water collection channel 210, then water can flow directly through the permeable sidewalk 208 and into the water detention cell 206.

Turning now to FIG. 3, the water runoff collection system 240 is generally similar to the system 200 of FIG. 2, except that the water collection system further includes a primary water collection channel 230, and the water collection channel 210 thus becomes a secondary water collection channel. More specifically, the primary water collection channel 230 includes an open vault 236 which is covered by water permeable tiles 238. (The water permeable tiles 238 can be provided according to U.S. Pat. No. 9,943,791.) It will be noted that in the water collection system 240 of FIG. 3 the curb 214 does not include openings to allow runoff water to flow directly from the street "S" onto the sidewalk 208. Rather, in the system 240 of FIG. 3 the curb 214 forms a continuous dam, thus forcing runoff water to flow into the vault 236 in the primary water collection channel 230. Further, in the system 240 the primary water collection channel 230 includes a water outlet 235 which is in fluid communication with the secondary water collection channel 210, and which passes through (or under) the curb 214. Accordingly, in the arrangement of the water collection system 240 of FIG. 3, runoff water from the street "S" first passes through the water permeable tiles 238 (thus leaving large particles on the surface of the tiles) and into the vault 236, and then from the vault to the secondary channel 210 via the water opening 235. Once in the secondary channel 210 the runoff water moves into the water retention cell 206 in the same manner as described above with respect to system 200 of FIG. 2.

Turning now to FIG. 4, the water collection system 260 is generally similar to that of the system 200 of FIG. 2, except that water flowing from the street "S" to the sidewalk 208 does not pass through a water collection channel before being introduced to the sidewalk. Rather, in the water collection system 260, runoff water from the street "S" flows through the periodic openings in the curb 214, and then across an apron 242 of a generally water pervious (or semi-pervious) zone which can be covered by a pre-filtering material, such as grass. (Grass can act as an organic filter to oxidize chemicals before they enter the water detention cell (206).) The configuration depicted in FIG. 4 allows a wider distance between the curb 214 and the shoulder 228, and thus allows a greater quantity of runoff water to accumulate over the water retention cell 206 than would be allowed for by the systems 200 and 240 of respective FIGS. 2 and 3. As described above, the water collection system 260 of FIG. 4 includes two settlement adjustment features (220A, 220B) versus the single settlement adjustment systems (220) for the systems depicted in FIGS. 2 and 3. The reason for providing the additional settlement adjustment system (220B, located at the street-side of the water retention cell 206) is that in the systems 200 and 240 of FIGS. 2 and 3 the water retention cell 206 is essentially tied to the curb (214), and is thus less likely to settle over time than is the case for the system 260 of FIG. 4.

Figure 5:
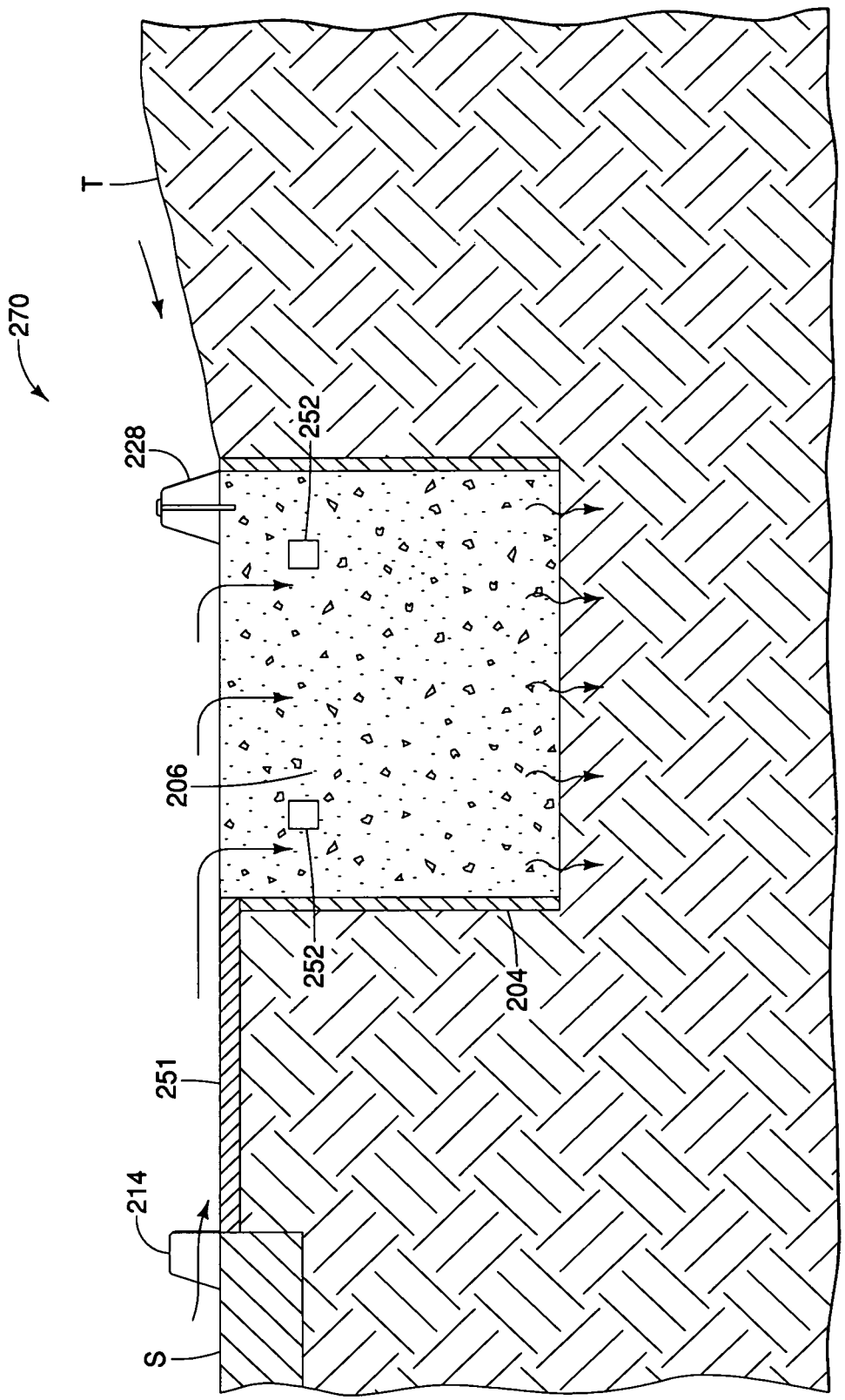
FIG. 5 is a sectional view of yet another variation of the storm water runoff collection system of FIG. 2.

Turning now to FIG. 5, the runoff water collection system 270 is generally similar to the system 260 of FIG. 4, except that in the system 270 (FIG. 5) there is no sidewalk (208 of FIG. 4) and no settlement adjustment system (220A, 2120B, FIG. 4). In fact, the water detention cell 206 of the system 270 can be considered as just a thick version of the water permeable sidewalks 208 of FIGS. 2-4. That is, the upper surface of the water detention cell 206 of FIG. 5 can serve as a sidewalk.

Turning now to FIGS. 6a and 6b, these figures depict a sump system 300 that can be used in conjunction with the storm water runoff collection system 260 of FIG. 4. FIG. 6a is an end sectional view of the sump system 300 (i.e., taken along the same sectional direction as that of the water collection system 260 of FIG. 4, but only translated further along), and FIG. 6b is a side sectional view of the sump system 300. In general, the purpose of the sump system 300 is to place a sump between periodic adjacent water collection systems 260 in order to further manage storm water runoff. That is, in a plan view (not provided), alongside a street "S" (as in FIG. 4), there can be large number of the water collection systems 260, periodically intervened (or interleaved) by one of the sump systems 300. The reason for providing periodic intervening sump systems 300 along the chain of water collection systems 260 is to further increase the runoff water handling capacity of the water collection systems. That is, the water collection system 260 is generally described above as managing runoff water by directing such water into the ground via the water retention cells 206. The sump system 300 includes a sump 310 which is disposed beneath the sidewalk 208. Preferably the water level in the sump 310 is maintained below a pre-established frost level "F" when freezing conditions can be present in the location where the sumps are installed. The sump 310 can include a catch basin 312 which can be provided with lowered sides 314 which allow water above the frost line "F" to run off into adjacent water-permeable formed concrete units 206 (generally, the same kind of units as the water detention cell 206 of FIG. 4,), which in turn allows the extracted water to be transported into the ground below the frost zone. Water can be provided to the sump 310 from surface runoff via water permeable sidewalk pavers 208, as well as directly by a line 316 which is connected to a water collection point (such as a roof drain, gutter, etc.). Water can also be provided to the sump 310 by a pipe or the like (not shown) connecting the sump to a water detention cell (206, FIG. 4). The water inlet pipe 316 is preferably introduced into the sump 310 below the frost line "F". The sump 310 can also be provided with an access cover 302 to allow inspection and clean-out of the sump 310. While not shown in FIGS. 6a and 6b, it will be appreciated that a number of the sumps 310 can be connected to one another in series, and ultimately discharged to a destination point (such as a water treatment facility, river, etc.).

While the runoff water collection systems of FIGS. 2 through 6b have been described above as having specific features, it will be understood that these figures, and the accompanying description, merely provide examples of how the porous, permeable concrete products provided for herein can be used in runoff water management systems, and that certain features can be excluded (e.g., the settlement adjustment feature 220), and that other features not provided for herein can be included, all within the general scope of using porous, permeable metal-cement based concrete products for enhanced management of the collection and distribution of runoff water from streets and other hard surfaces.

Figure 7B:
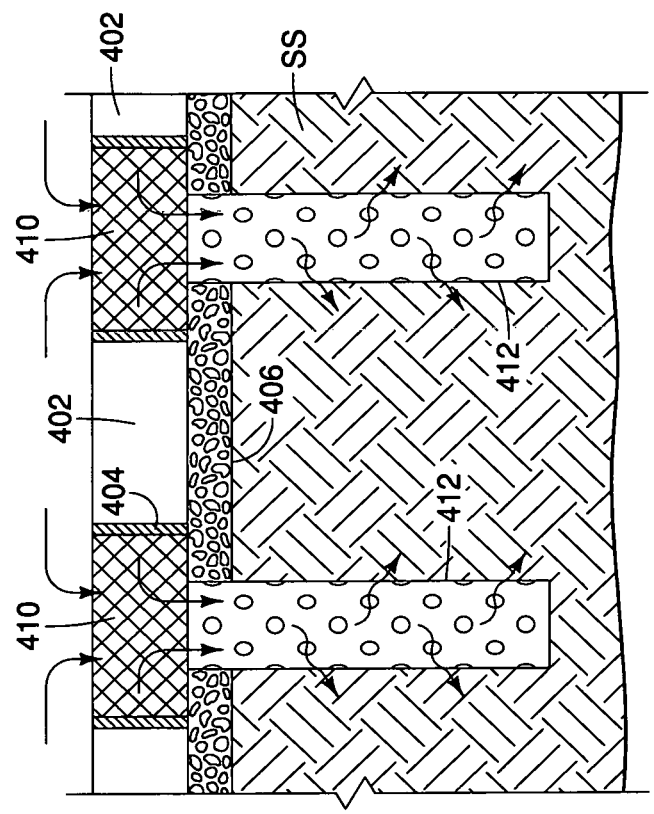
FIG. 7*b* is a sectional view of the gap paving system of FIG. 7*a*.
Figure 7A:
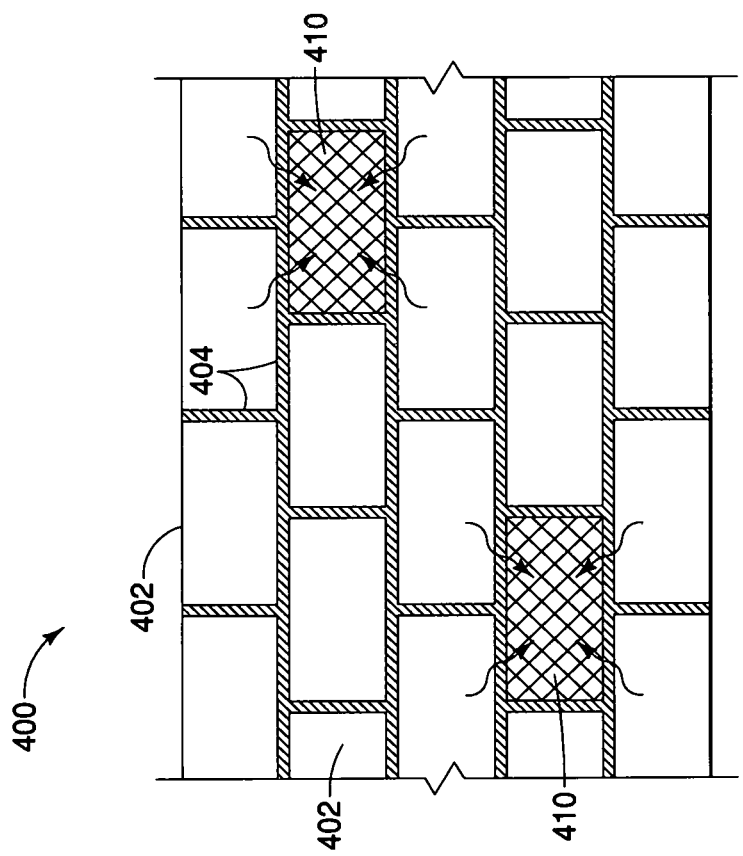
FIG. 7*a* is a plan view of a gap paving system that includes porous, permeable cement water retention cells fabricated according to the methods provided for herein.

Turning now to FIGS. 7a and 7b, a further water runoff management system 400 for gap-paving installations is depicted. FIG. 7a is a plan view of a gap-paving system, and FIG. 7b is a sectional end view of the gap paving system of FIG. 7a. A gap-paving system is generally a paving system for walkways, plazas, and other open areas where water can accumulate. Gap-paving is the placement of pavers over an open area, with gaps provided between adjacent pavers. The gaps between the pavers are typically provided with a water-permeable filler, such as sand or dirt, which allows a certain amount of water (such as rain) falling on the pavers to infiltrate into the ground. By the periodic installation of water-permeable pavers in conjunction with associated porous, permeable water detention cells, the capacity for gap paving installations to take-up incipient excess water can be enhanced, thus reducing the potential for water to pool over the surfaces of gap-paver installations. FIG. 7a is a plan view of a gap-paver system 400, depicting a gap-paving installation including generally water-impermeable pavers 402, interspaced by gaps (404), and interspersed with water-permeable pavers 410. The water-permeable pavers 410 can be fabricated according the method provided for in U.S. Pat. No. 9,943,791. Turning to FIG. 7b, a cross sectional view of the gap-paving system 400 of FIG. 7a depicts that beneath each water-permeable paver 410 is a water detention cell 412 which is in direct fluid communication with the associated water-permeable paver 410. It will also be noted that the generally water-impervious pavers 402 are set on leveling material 406 (such as sand), which can communicate water from the gaps 404 into the water detention cells 412. The water detention cells 412 can then disperse water into the subsurface terrain "SS". The water-detention cells 412 are thus able to move water from upper dry zones (where water may not be as easily absorbed into the ground) to lower areas where absorption can be more easily achieved.

Figure 8A:
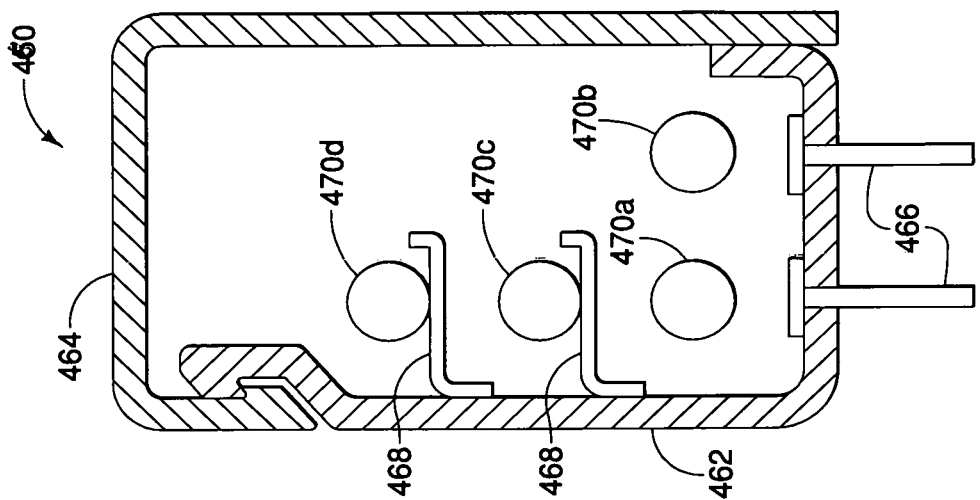
FIG. 8A is a detail from FIG. 8 showing details for a utility curb.
Figure 8:
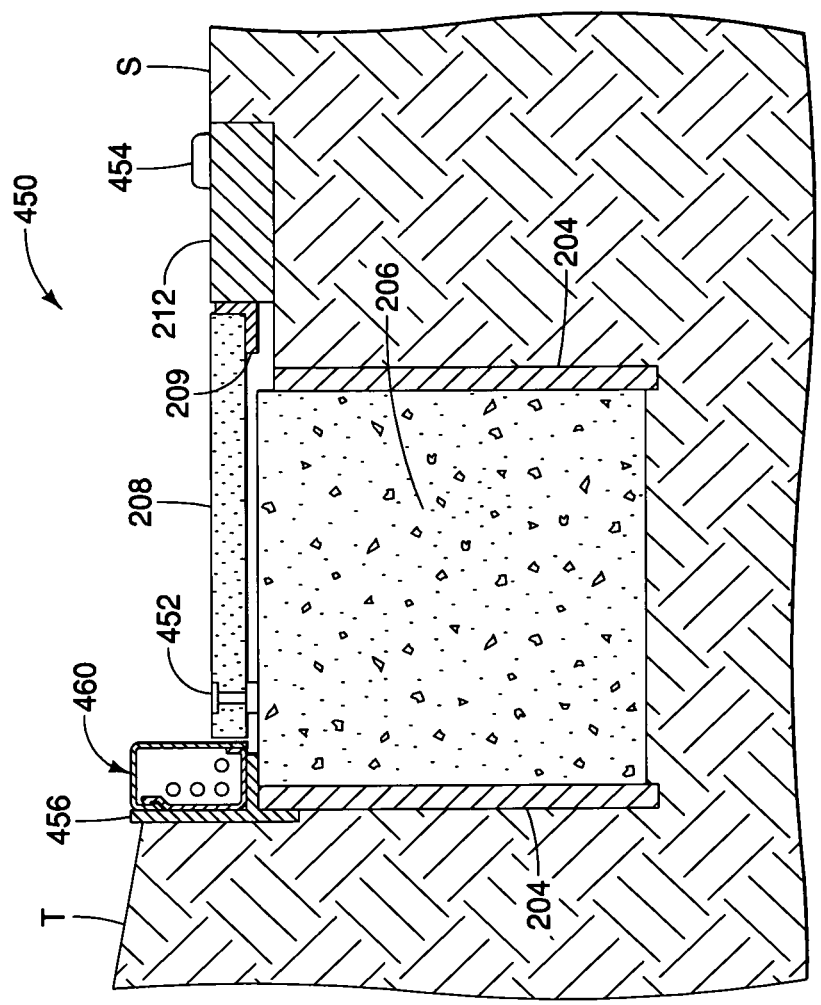
FIG. 8 is a sectional view of another storm water runoff collection system that includes a porous, permeable cement water retention cell fabricated according to the methods provided for herein.

A further storm water runoff collection system that includes a porous, permeable cement water retention cell fabricated according to the methods provided for herein is depicted in the sectional view of FIG. 8. The storm water runoff collection system 450 of FIG. 8 is generally similar to the storm water runoff collection system 200 of FIG. 2. The system 450 of FIG. 8 is depicted in the figure as being bordered on the left side by terrain ("T"), and on the right side by a street ("S"). The system 450 includes an apron 212, which is preferably manufactured of a generally impermeable material such as Portland cement, a generally permeable sidewalk 208 (essentially as described above with respect to FIG. 2), and a porous, permeable concrete water detention cell 206 (also described above with respect to FIG. 2) which is sealed on the sides by impermeable grout 204. The sidewalk 208 can be removably supported by a sidewalk support bracket 209 which can be anchored to the apron 212. The system 450 can include a settlement adjustment feature such as the item 220 of FIG. 2, or a simple screw-jack (452) between the top of the detention cell 206 and the bottom of the sidewalk 208 in order to level the sidewalk (preferably with a slight tilt towards the terrain side—i.e., away from the street "S"). It will be noted that the system 450 does not include a traditional curb (such as curb 214 of FIG. 2), but rather can include intermittent parking delineators (454) positioned at or near the street/apron juncture. The parking delineators 454 can be fabricated from cement or a synthetic material, and can be a different color than the apron (212) to facilitate in delineating the apron from the sidewalk (208). The system 450 of FIG. 8 can be implemented either as a new construction, or as a retrofit of an existing infrastructure. (In a retrofit installation, an existing curb adjacent to the street "S" is removed, and the existing sidewalk is removed and a new water permeable sidewalk 208 of FIG. 8 is installed level with the street "S".) In this way storm water can run directly from the street "S" onto the sidewalk 208, then flowing through the sidewalk into the storm water detention cell 206. A curb (460) holds water onto the permeable sidewalk 208 until it can flow into the storm water detention cell 206. The curb 460 can be supported by a curb support frame 456 which can facilitate in providing a water seal between the terrain "T" and the sidewalk 208, to thus mitigate water from the sidewalk flowing into the terrain. It will be noted that the storm water runoff collection system 450 of FIG. 8 is distinguished from a traditional street/sidewalk arrangement which attempts to keep water from the street migrating onto the sidewalk—i.e., the system 450 actually facilitates storm water from the street "S" migrating onto the sidewalk 208, such that the water can be removed via the storm water detention cell 206 residing beneath the sidewalk.

The curb 460 of the storm water runoff collection system 450 of FIG. 8 can be a traditional curb formed from concrete or stone, or (as depicted in FIG. 8A) the curb 460 can be formed as a hollow conduit. In FIG. 8A the utility curb 460 includes a base segment (462) and a removable upper cap (464). The base segment 462 can be formed from materials such as steel, and the upper cap 464 can be formed from a durable material such as glass fiber reinforced concrete or crush-resistant plastic. The utility curb 460 can house utility lines 470a-470d, which can include utilities such as telecommunication lines (optical fiber, coaxial cable, etc.), medium power electrical lines, and power lines from local solar power panels. Telecommunication repeater units, antennas, and other such components (not shown in FIG. 8A) can also be housed in the utility curb 460. (The street/sidewalk delineator 454 can include wireless repeater units molded therein which can communicate with antennas housed within the curb 460.) The utility curb 460 can also include line hangers (468) to support at least some of the utility lines (e.g., 470c and 470d). The utility curb 460 can be anchored to the water detention cell 206 by cement anchors 466 or the like. In one variation the utility curb 460 can be replaced with a utility corridor, such as item 510 of FIG. 9 (described below). That is, the utility curb 460 can be enlarged to handle primary utility lines such as water, gas and electric. In this case the utility curb would extend partially, or mostly, below the sidewalk 208, and can be anchored to the water detention cell 206, or be separately supported by a pylon (not shown). In any event the utility curb/corridor can still act as a barrier between the terrain "T" and the sidewalk 208.

Turning now to FIG. 9, a street and utility system 500 is depicted in an end sectional view. The street and utility system 500 allows for managing storm water runoff from a street, as well as placement of utility lines in a separate corridor (510) which does not necessitate removing sections of street covering in order to service existing utility lines or install new lines. That is, prior art street and utility systems typically place utility lines (such as water lines and sewage lines) beneath a street which is covered by an asphalt or concrete street covering. In order to repair or replace these utility lines, sections of the street covering are removed, and subsequent patches oftentimes fail to restore the street covering to its original condition. Further, since such prior art street coverings are typically laid directly on supporting terrain (albeit, with an intermediate layer of crushed rock and/or gravel), the street coverings are subject to deterioration by settlement of the underlying terrain, which can occur due to earth movement, water intrusion, desiccation of the terrain, etc. The street and utility system 500 of FIG. 9 addresses these issues, as well as the storm water management issue discussed previously above. The street and utility system 500 includes a separate utility corridor 510 which is located to one side of (and not beneath) the street 502. The utility corridor 510 can be placed between two separate street sections 502a and 502b, or to one side of a single street section (e.g., 502a). Thus, street sections 502a and 502b can each be dedicated one-way street sections, divided by the utility corridor 510, or a single street section (e.g., 502a) can be a two-way street section. The street sections 502 will be described further below. The utility corridor 510 can include a "U" shaped channel or main body section 512, which can be covered by top panels 516. The utility corridor main body section 512 can be fabricated from reinforced concrete, and the top panels 516 can be concrete panels or sheet steel, for example. The top panels 516 can be provided with a manhole and access cover (518) to allow access to the utility corridor 510 without having to remove the top panel 516. The utility corridor 510 can be supported by a pile 514 or other support to resist settling of the corridor. The utility corridor 510 is depicted as housing utility lines 530a-530c, which can be, for example, a water line, a gas line, an electrical power line, telecommunication signal lines, etc. As it is desirable to separate certain utility lines from one another to prevent possible cross contamination, a second utility corridor 520 can be supported from the first utility corridor 510. The interior of the secondary utility corridor 520 is physically separated from the interior of the first utility corridor 510 by the second corridor cover 526. The secondary utility corridor 520 is depicted housing utility lines 530d and 530e.

With continued reference to FIG. 9, the street sections 502 are supported at a first side by the pile-supported utility corridor 510, and at a second (or outer) side by a street section pile 509. In this way the street sections 502 of the system 500 are not supported by the underlying terrain "T", and are thus resistant to damage from settling of the terrain. Turning briefly to FIG. 9A, street section 502a is depicted in a side sectional view. As depicted in FIG. 9A, the street section 502a can be cast or formed as a structural member with an upper main section 507 and lower reinforcing sections 509. The reinforcing sections 509 (as well as the upper main section 507) can be reinforced with reinforcing steel 511 or other reinforcing materials embedded in the street section 502a. The street sections 502 can be fabricated from concrete manufactured according to the methods provided for herein. Typically the street sections 502 will be fabricated as water impermeable sections, such that storm water and the like runs off of the street sections and to a storm water management system (discussed further below). As depicted in FIG. 9, the street section 502a is sloped slightly downward from the utility corridor 510 to the apron 212. Storm water flowing from the street section 502a crosses the impermeable apron 212, and flows across the water permeable sidewalk 208, and into the storm water detention cell 206, all as described above with respect to FIG. 8. A street curb 460 (see also FIG. 8) allows water to accumulate on the water permeable sidewalk 208, versus running off to other areas. It will be appreciated that the configuration depicted in FIG. 9 removes the need for a separate collected storm water line in the utility corridor 510 (or in the terrain "T" beneath the street sections 502) as storm water can be handled by diverting it off of the street (502) and into storm water detention cells 206 in the manner described above (e.g., FIG. 2). In one variation, rather than the street sections 502 being water-impermeable, they can be water permeable concrete sections manufactured according to the methods provided for herein for manufacturing metal-cement based porous concrete structures. In that event the terrain "T" beneath the street sections 502 can be replaced with water detention cells 206. It will also be appreciated that the street sections 502 can be fabricated as pre-cast units, and thus installation time is significantly reduced over prior art paving or concrete pouring methods for putting street surfaces in place.

In-situ application of metal-based cements to form concrete. A further example of a method of forming a metal-cement based concrete product is injection of a metal cement reacting agent into in-situ ground to form a solidified mass—essentially, a metal-cement based concrete product. More specifically, it can be desirable to consolidate ground or terrain to prevent erosion, landslides, and slumping, as well as to make the ground or terrain less permeable to water (for example, to reduce landslides due to rain). Since many ground compositions (soils, rocks, and combinations thereof) include metals and silicates, the ground can already thus possess materials which can act as a metal-based cementing agent, as well as an aggregate. In order to activate these in-situ components and get them to form a metal cement (or a metal-cement based concrete), a metal-cement reacting agent can be injected into the ground. Examples of the metal-cement reacting agents that can be used are as described above, and can include phosphates and borates. The metal-cement reacting agent can be injected into the ground under pressure and into injection holes drilled into the ground. Preferably, prior to injecting a metal-cement reacting agent, samples of the ground are analyzed to determine which metals are present, and in what percentages, to thus allow a preferred metal-cement reacting agent to be selected, and the injection quantities to be calculated. This method of in-situ forming of metal cement (and/or metal-cement based concrete) can be useful for increasing the durability of earthen dams, stabilizing tailings impoundments, stabilizing roadbeds and trails, and strengthening earthen foundations.

Use of porous, permeable metal-cement based concrete products as catalysts. The porous, permeable metal-cement based concrete products provided for herein can be used as catalysts in certain circumstances. Specifically, a fluid containing components that can be advantageously reacted to an end product can be flowed through the porous, permeable metal-cement based concrete product, and metals within the concrete product (particularly metals which are part of the aggregate) can act as a catalyst in order to encourage the advantageous reaction. Further, an aggregate can be selected which has two metals present—a first metal selected to react with the metal-cement reacting agent (in order to form the concrete product), and a second metal selected to act as the catalyst for the chemical reaction of the fluid being flowed through the porous, permeable concrete product. In addition to metals in the aggregate acting as a catalyst, metals in the metal-based cementing agent can also act as catalysts. Preferably the metal-cement based concrete includes at least one metal selected from the group of transition metals in the periodic table of the elements. Metals that can be used (preferably in the amount of between 25 to 50% of the metal in the metal cement, either singly or in combination) include gold, silver, nickel, platinum and palladium. Depending on the intended use as a catalyst, alkali metals can also be included in the catalytic sieve. The porous, permeable metal-cement based concrete product are particularly useful to as catalytic sieves due to their high rate of flow of liquids through the product (20 inches of liquid water per hour at atmospheric pressure), their high interior surface area (calculated to be between $10^6$ and $10^8$ square meters per cubic meter of volume ($m^2/m^3$), small pore size (10-100 nm diameter), and high porosity (30-50% of volume). The catalytic sieve is particularly effective as a heterogeneous catalyst, as when the component to be catalyzed is a gas dissolved in a liquid such as water. In one specific example, when the metal-cement based concrete product includes zinc (as in either the metal cement and/or the aggregate), water bearing molecular nitrogen flowed through the concrete product resulted in dissociation of the molecular nitrogen into atomic nitrogen, after which it was able to combine with other components to produce products such as amines. Exemplary metals that can be used in the metal cement and/or the aggregate which have catalytic properties include zinc, copper, molybdenum, vanadium, palladium, gold, nickel, and, less desirably, iron. The aggregate used in the manufacture of these catalytic sieves can be low in metals (e.g., clay), and the amount of the metal-cement used can be increased to thus provide more of the selected catalytic metal in the concrete product. It will be appreciated that the manufacture of certain of the concrete products provided for herein can result in a catalytic sieve, even if that is not the intended goal. Accordingly, in order to prevent undesired catalytic action from occurring, the catalytic sites can be neutralized by the addition of a neutralizing agent, such as soluble silicates. An efficient way to accomplish this is by treating the surface of the concrete product with a sodium silicate stain, which can also provide the product with a desired color for aesthetic purposes. Likewise, in order to obtain catalytic action from a concrete product provided for herein which may be lacking in the desired catalytic metals is to surface treat the concrete product with a liquid solution having the catalytic metals therein, which will then adhere to the pore surfaces of the concrete product.

The catalytic sieves can be used to treat natural bodies of water (oceans, streams, lakes, etc.) which contain dissolved gasses, for the purpose of removing or neutralizing those gasses. For example, carbon dioxide can be removed from ocean water by using a catalytic sieve selected to react the carbon dioxide with calcium ions in the water to generate calcium carbonate, and thus capture the carbon. Likewise, nitrogen can be captured by the catalytic sieves provided for herein. The catalytic sieves, in the form of concrete blocks, can be placed in these natural bodies of water, and currents will move the water through the concrete block in order to generate the desired reaction products.

Other uses of porous, permeable metal-cement based concrete products as catalysts. The porous, permeable metal-cement based concrete products provided for herein can be used as a desiccant to remove moisture from the atmosphere. Whereas silica gel (a common desiccant) has a mean pore diameter of about 2.4 nm, the porous concrete product provided for herein has typical pore diameters in the range of 2-10 nm, making it a superior desiccant. Thus, a large block of the porous, permeable metal-cement based concrete (such as the water detention cell 206 of FIGS. 2-5) can be placed in the ground, and the temperature differential between the top and bottom of the concrete block will cause the concrete block to extract moisture from air inside the tank. In another use, since the porous, permeable concrete product provided for herein can have electrically conductive metal elements exposed on the pores of the product (as described above with respect to use of the product as a catalytic sieve), and the conductive metal elements are separated from one another by generally non-conductive elements (such as silica, phosphorous, etc.), then the concrete product can be used to store electrical charge in the manner of a capacitor. This can be accomplished by forming a galvanic voltage potential between conductive metal compounds that make up the metal-based cements and the aggregate (e.g., zinc phosphate in the cement and titanium phosphate in the aggregate). The concrete product can thus be used to store direct current voltage from renewable energy sources (wind, solar) for later use in off-peak production. The flow of electricity to and from the capacitor can be facilitated by the charges formed on the metallic compounds during formation of the concrete product—e.g., between $Fe^{+2}$-phosphate and $Fe^{+3}$-sulfate. Further, the large surface area of the pores in the concrete product ($10^6$ and $10^8$ square meters per cubic meter of volume) allows the concrete product to store a large amount of electrical charge.

The preceding description has been presented only to illustrate and describe exemplary methods and apparatus of the present invention. It is not intended to be exhaustive or to limit the disclosure to any precise form disclosed. Many modifications and variations are possible in light of the above teaching.

I claim:

1. A method for manufacturing a porous, permeable concrete product, comprising:
providing a metal-based cementing agent;
providing an acid-based cement reacting agent of the form $H_nXO_m$, wherein "X" is an element selected from group consisting of phosphorous, carbon, sulfur and boron, "n" and "m" are selected so that the acid-based cement reacting agent is an acid, and "X" in the acid-based cement reacting agent will bond with the metal-based cementing agent to form a metal cement;
providing an aggregate, the aggregate being defined by an exposed surface area having metallic aggregate linking elements thereon which can chemically bond with "X" in the presence of the acid-based cement reacting agent;
providing a hydroxide-supplying additive;
providing a supplemental liquid to enable mixing of components;
combining and mixing together the metal-based cementing agent, the acid-based cement reacting agent, the hydroxide-supplying additive, the supplemental liquid and the aggregate to form a mixture;
allowing the mixture to dry to a solidified unit; and
heating the solidified unit to a temperature of between 300° F. and 550° F. for a period of time of between 30 minutes and 60 minutes per inch of thickness of the solidified unit to generate the porous, permeable concrete product.

2. The method of claim 1, wherein the metal-based cementing agent is selected from the group consisting of metal oxides, metal hydroxides, metal phosphates, metal borates, metal sulfates, metal carbonates, metal halides, metal formates, metal acetates and metal peroxides.

3. The method of claim 1, wherein the acid-based cement reacting agent is selected from the group consisting of phosphoric acid, boric acid, sulfuric acid, and hydrochloric acid.

4. The method of claim 1, wherein the hydroxide-supplying additive is selected from the group consisting of kaolin clay, talc, bauxite and aluminum oxide.

5. The method of claim 1, wherein the supplemental liquid is water.

6. The method of claim 1, further comprising providing reinforcing fibers to the mixture.

7. The method of claim 1, further comprising providing a setting agent to the mixture.

8. The method of claim 7, wherein the setting agent is one or more of magnetite and iron peroxide.

9. The method of claim 7, further comprising providing a plasticizer to the mixture.

10. The method of claim 9, wherein the plasticizer is hydrogen peroxide.

11. The method of claim 1, wherein the aggregate comprises at least 85% by weight of mine tailings.

12. The method of claim 1, wherein the aggregate comprises at least 25% by weight of clay.

13. The method of claim 1, wherein at least 85% by weight of the metallic aggregate linking elements in the aggregate comprise aluminum.

14. The method of claim 1, wherein at least 6% by weight of the metallic aggregate linking elements in the aggregate comprise one or more of sodium and potassium.

15. The method of claim 1, wherein the mixture is dried to the solidified unit in a vacuum chamber at a pressure of between 1 and 2 psi below atmospheric pressure.

16. The method of claim 1, further comprising providing an excess acid scavenger to the mixture.

17. The method of claim 16, wherein the excess acid scavenger is selected from the group consisting of feldspar, sodium, feldspar potassium silicate and sodium silicate.

18. The method of claim 1, wherein:
at least 90% by weight of the metal-based cementing agent is comprised of zinc sulfate;
the cement reacting agent comprises at least one of phosphoric acid;
the aggregate comprises quartzite sized such that 50% by volume passes 150 mesh, and 100% by volume passes 50 mesh; and
the hydroxide-supplying additive comprises EPK clay.

19. The method of claim 18, further comprising providing a setting agent to the mixture, the setting agent comprising magnetite.

20. The method of claim 1, wherein the metal-based cementing agent includes one or more metal selected from the group consisting of nickel, gold, silver, palladium and platinum, and the metal comprises between 25% and 50% by weight of the metal-based cementing agent.

* * * * *